(12) United States Patent
Gebremariam et al.

(10) Patent No.: US 10,824,694 B1
(45) Date of Patent: Nov. 3, 2020

(54) DISTRIBUTABLE FEATURE ANALYSIS IN MODEL TRAINING SYSTEM

(71) Applicant: SAS Institute Inc., Cary, NC (US)

(72) Inventors: Biruk Gebremariam, Cary, NC (US); Mark Traccarella, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/842,111

(22) Filed: Apr. 7, 2020

Related U.S. Application Data

(60) Provisional application No. 62/936,763, filed on Nov. 18, 2019, provisional application No. 62/950,344, filed on Dec. 19, 2019.

(51) Int. Cl.
*G06Q 40/00* (2012.01)
*G06F 17/16* (2006.01)
*G06N 20/00* (2019.01)
*G06F 7/58* (2006.01)
*G06F 8/41* (2018.01)
*G06F 17/11* (2006.01)

(52) U.S. Cl.
CPC ............ *G06F 17/16* (2013.01); *G06F 7/588* (2013.01); *G06N 20/00* (2019.01); *G06F 8/44* (2013.01); *G06F 17/11* (2013.01)

(58) Field of Classification Search
CPC .......... G06F 17/16; G06F 17/11; G06F 7/588; G06F 8/44; G06F 9/382; G06F 9/46; G06F 9/38; G06F 9/3824; G06N 20/00
See application file for complete search history.

(56) References Cited

U.S. PATENT DOCUMENTS

| | | | | |
|---|---|---|---|---|
| 5,957,859 | A * | 9/1999 | Rosenfeld | A61B 5/164 128/898 |
| 10,025,813 | B1* | 7/2018 | Gebremariam | G06N 20/00 |
| 2008/0195983 | A1* | 8/2008 | Chidambarrao | G06F 30/39 716/132 |

(Continued)

OTHER PUBLICATIONS

Ted Dunning et al., Computing Extremely Accurate Quantiles Using t-Digests, Feb. 11, 2019, [Retrieved on May 11, 2020]. Retrieved from the internet: <URL: https://arxiv.org/pdf/1902.04023.pdf> 22 Pages (1-22) (Year: 2019).*

(Continued)

*Primary Examiner* — Anibal Rivera
(74) *Attorney, Agent, or Firm* — Bell & Manning, LLC

(57) ABSTRACT

A computing system defines transformed variable values for training a machine learning model. A data description is determined for each variable of a plurality of variables from observation vectors. A number of rare-levels is determined for any variable of the plurality of variables that has a nominal variable type. Bins that describe a cumulative distribution function are defined for each variable based on the data description determined for each variable and based on the number of rare-levels determined for any variable of the plurality of variables identified as the nominal variable type. A transformed value is determined for each variable and for each observation vector of the observation vectors using the bins defined for a respective variable of the plurality of variables. Each determined transformed value is written to a transformed dataset with a respective observation vector of the observation vectors.

30 Claims, 26 Drawing Sheets

(56) References Cited

U.S. PATENT DOCUMENTS

| | | | | |
|---|---|---|---|---|
| 2009/0157363 | A1* | 6/2009 | Barnes | B64F 5/00 703/8 |
| 2014/0257128 | A1* | 9/2014 | Moxon | A61B 5/7282 600/544 |
| 2016/0012235 | A1* | 1/2016 | Lee | G06K 9/00442 726/25 |
| 2016/0292162 | A1* | 10/2016 | Guirguis | G06N 20/00 |
| 2017/0083237 | A1* | 3/2017 | Potash | G06F 8/44 |
| 2017/0083238 | A1* | 3/2017 | Potash | G06F 9/46 |
| 2017/0083434 | A1* | 3/2017 | Potash | G06F 9/46 |
| 2017/0083449 | A1* | 3/2017 | Potash | G06F 9/3824 |
| 2017/0083464 | A1* | 3/2017 | Potash | G06F 13/4068 |
| 2018/0032964 | A1* | 2/2018 | Gkiotsalitis | G08G 1/127 |
| 2018/0131266 | A1* | 5/2018 | Rohr | H02M 7/217 |
| 2018/0181541 | A1* | 6/2018 | Yao | G06F 17/11 |
| 2019/0122122 | A1* | 4/2019 | Rope | G06N 5/04 |
| 2019/0258904 | A1* | 8/2019 | Ma | G06K 9/6269 |
| 2019/0370684 | A1* | 12/2019 | Gunes | G06N 20/00 |

OTHER PUBLICATIONS

Fulvio Ginii et al., The Modified Cramer-Rao Bound in Vector Parameter Estimation, 1998 IEEE, [Retrieved on Jul. 1, 2020]. Retrieved from the internet: <URL: https://ieeexplore.ieee.org/stamp/stamp.jsp?tp=&arnumber=655403> 9 Pages (52-60) (Year: 1998).*
Yili Xia et al., Adaptive Frequency Estimation in Smart Grid Applications, Sep. 2012, [Retrieved on Jul. 1, 2020]. Retrieved from the internet: <URL: https://ieeexplore.ieee.org/stamp/stamp.jsp?tp=&arnumber=6279596> 11 Pages (44-54) (Year: 2012).*
Gemp, I., Theocharous, G. and Ghavamzadeh, M. "Data Cleansing through Meta-learning." Proceedings of the Twenty-Ninth AAAI Conference on Innovative Applications (IAAI-17)) 2017.
Fazel Famili et al.: "Data preprocessing and intelligent data analysis", International Journal on Intelligent Data Analysis, vol. 1, Issues 1-4, 1997.
Guyon, I and Andre, E, 2003. "An Introduction to Variable and Feature Selection." Journal of Machine Learning Research 3, 1157-1182.
Miron B. Kursa, Witold R. Rudnicki, Feature Selection with the Boruta Package Journal of Statistical Software. Sep. 2010, vol. 36, Issue 11.
André Altmann, Laura Tolo, Oliver Sander, Thomas Lengauer, Permutation importance: a corrected feature importance measure, Bioinformatics, vol. 26, Issue 10, May 15, 2010, pp. 1340-1347.
Ribeiro, Marco & Singh, Sameer & Guestrin, Carlos. (2016). "Why Should I Trust You?": Explaining the Predictions of Any Classifier. 97-101. 10.18653/v1/N16-3020.
Lundberg, Scott and Su-In Lee. "A Unified Approach to Interpreting Model Predictions." ArXiv abs/1705.07874 (2017).
Sort Benchmark Home Page, printed from the internet May 6, 2020; http://sortbenchmark.org/.
Misra, J.; Gries, David (1982). "Finding repeated elements". Science of Computer Programming. 2 (2): 143-152. doi:10.1016/0167-6423(82)90012-0, 1982.
Stefan Heule, Marc Nunkesser, and Alexander Hall. 2013. HyperLogLog in practice: algorithmic engineering of a state of the art cardinality estimation algorithm. In Proceedings of the 16th International Conference on Extending Database Technology (EDBT '13). ACM, New York, NY, USA, 683-692. DOI: https://doi.org/10.1145/2452376.2452456.
Pankaj K. Agarwal, Graham Cormode, Zengfeng Huang, Jeff Phillips, Zhewei Wei, and Ke Yi. 2012. Mergeable summaries. In Proceedings of the 31st ACM SIGMOD-SIGACT-SIGAI symposium on Principles of Database Systems (PODS '12 (Ed.). ACM, New York, NY, USA, 23-34. May 2012 DOI: http://doi.org/10.1145/2213556.2213562.
Isabelle Guyon, et al, 2007. Competitive baseline methods set new standards for the NIPS 2003 feature selection benchmark. Pattern Recognition Letters 28 (2007) 1438-1444.
4.2 Permutation feature importance—scikit-learn .022 documentation, printed from the internet Dec. 19, 2019; https://scikit-learn.org/stable/modules/permutatin_importance.html.
5.5 Permutation Feature Importance—Interpretable Machine Learning, printed from the Internet Dec. 19, 2019; https://christophm.github.io/interpretable-ml-book/feature-importance.html.
Add permutation based feature importance? Issue #11187 scikit-learn/scikit-learn Git Hub, discussion opened Jun. 1, 2018, printed from the internet Dec. 19, 2019; https://github.com/scikit-learn/scikit-learn/issues/11187.
Feature Importance Permutation—mixtend, copyright 2014-2019, printed from the internet Dec. 19, 2019; rasbt.github.io/mixtend/user_guide/evaluate/feature_importance_permutation/.
How to Use scikit-learn 'eli5' Library to Compute Permutation Importance? Printed from the internet Dec. 19, 2019; https://medium.com/towards-artificial-intelligence/how-to-use-scikit-learn-eli5-library-to-compute-permutation-importance-9af131ece387.
Permutation Feature Importance Machine Learning Blog, printed from the internet Dec. 19, 2019; https://blogs.technet.microsoft.com/machinelearning/2015/04/14/permutation-feature-importance/ blog posted Apr. 14, 2015.
Permutation Importance from Docs>Inspecting Black-Box Estimators>Permutation Importance; printed from the internet Dec. 19, 2019.
Permutation Importance Kaggle, Machine Learning Explainability Home Page (https://www.kaggle.com/learn/machine-learning-explainability), printed from the internet Dec. 19, 2019.
Python implementations of the Boruta all-relevant feature selection method, scikit-learn-contrib/boruty_py, printed from the internet Apr. 3, 2020.
Ted Dunning, Computing Extremely Accurate Quantiles Using t-Digests; arXiv:1902.04023v1 [stat.CO] Feb. 11, 2019.
SAS Enterprise Miner 14.3 High Performance Procedures, Chapters 1, 2, 3, and 7, SAS Institute Inc. Jan. 2019.
SAS Visual Data Mining and Machine Learning 8.1 Data Mining and Machine Learning Procedures, Chapters 1-9, and 12, SAS Institute Inc. Mar. 2017.
SAS Visual Data Mining and Machine Learning 8.1 Statistical Procedures, Chapters 1, 2, 4, 11, SAS Institute Inc. Sep. 2016.

* cited by examiner

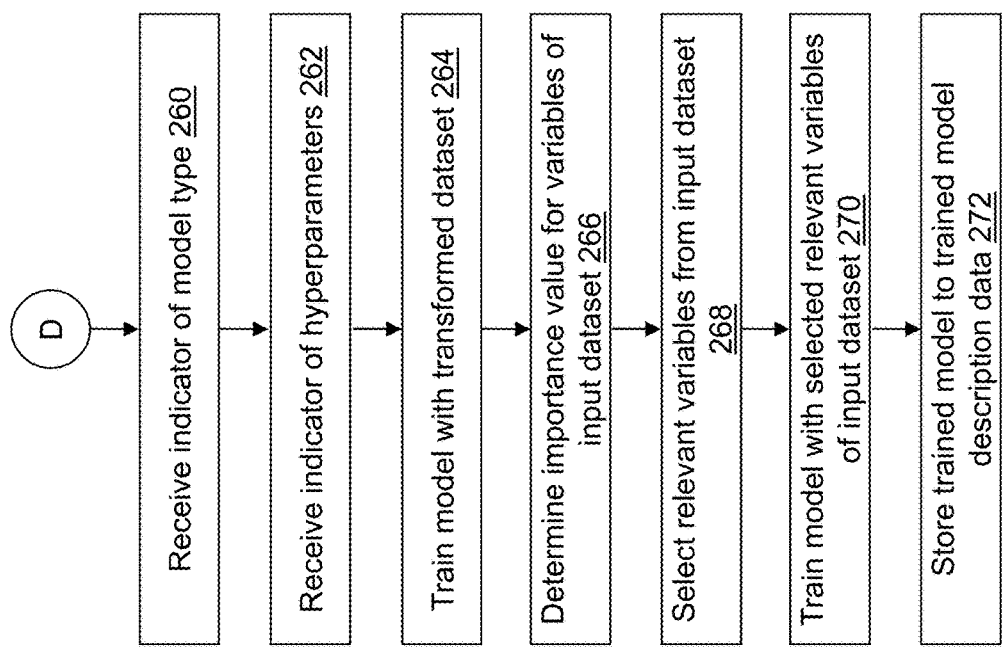

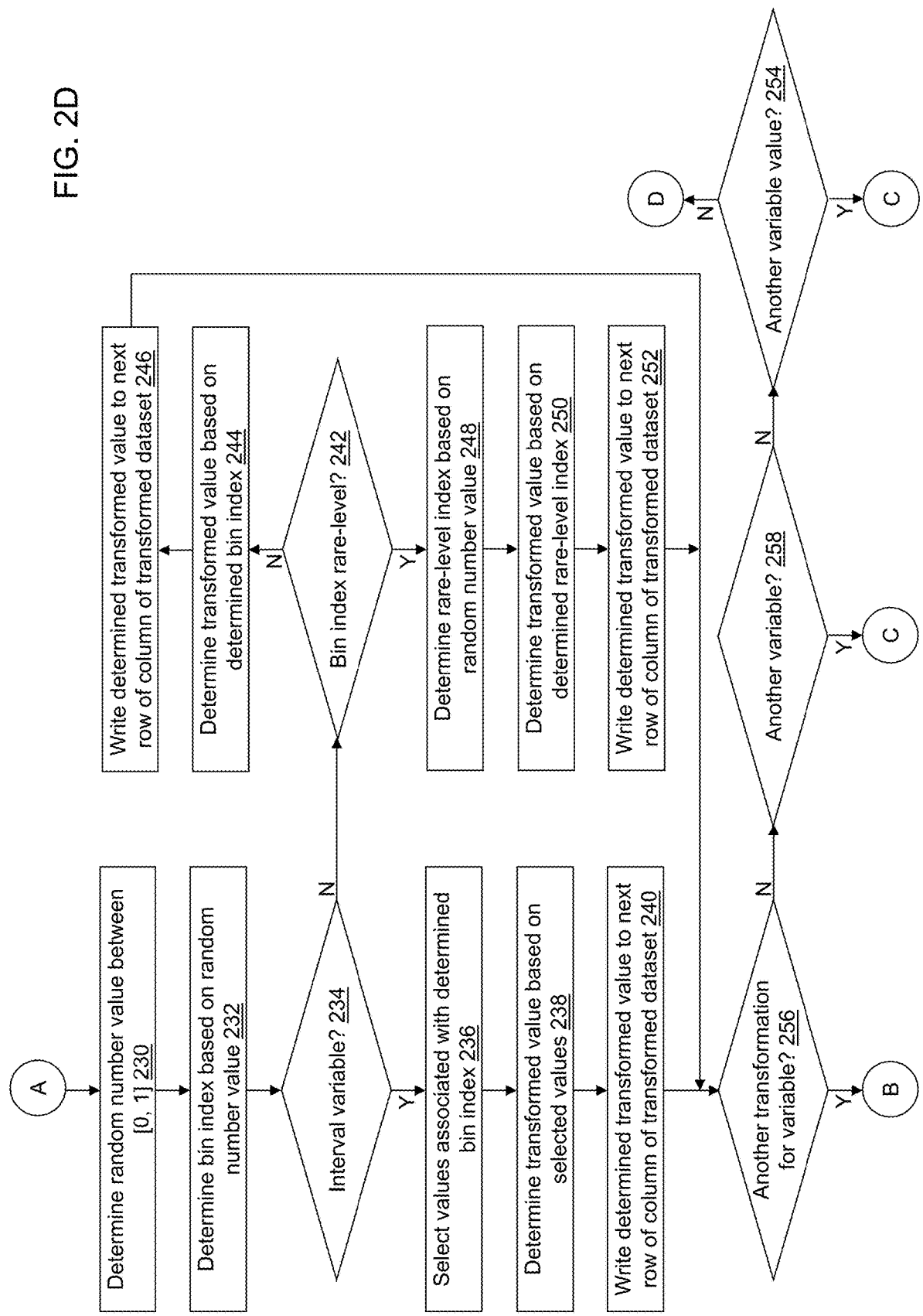

| | Variable | BinId | BinLowerBnd | BinUpperBnd | BinWidth | NinBin | Mean | Std | Min | Max |
|---|---|---|---|---|---|---|---|---|---|---|
| | 1102 | 1104 | 1106 | 1108 | 1110 | 1112 | 1114 | 1116 | 1118 | 1120 |
| 11 | HV1 | 12 | 0.000 | 113.888 | 113.888 | 1145 | 2.300437 | 14.709919 | 0.0 | 113.0 |
| 12 | HV1 | 13 | 113.888 | 150.000 | 36.112 | 56 | 132.553571 | 9.026084 | 115.0 | 149.0 |
| 13 | HV1 | 14 | 150.000 | 166.000 | 16.000 | 133 | 153.842105 | 5.345408 | 150.0 | 165.0 |
| 14 | HV1 | 15 | 166.000 | 179.000 | 13.000 | 95 | 171.989474 | 3.413037 | 166.0 | 178.0 |
| 15 | HV1 | 16 | 179.000 | 190.000 | 11.000 | 84 | 184.255319 | 3.044248 | 179.0 | 189.0 |
| | ⋮ | | | | | | | | | |
| 995 | HV1 | 996 | 5714.000 | 5783.000 | 69.000 | 84 | 5748.158574 | 21.307429 | 5714.0 | 5782.0 |
| 996 | HV1 | 997 | 5783.000 | 5835.000 | 52.000 | 98 | 5806.275510 | 13.931188 | 5783.0 | 5831.0 |
| 997 | HV1 | 998 | 5835.000 | 5889.000 | 54.000 | 92 | 5863.000000 | 14.402381 | 5835.0 | 5887.0 |
| 998 | HV1 | 999 | 5889.000 | 5950.000 | 61.000 | 97 | 5923.092784 | 16.909121 | 5889.0 | 5949.0 |
| 999 | HV1 | 1000 | 5950.000 | 6000.000 | 50.000 | 98 | 5970.602041 | 16.972834 | 5950.0 | 6000.0 |

FIG. 11

Require: Let $h : \mathcal{D} \to \{0,1\}^{32}$ hash data from domain $\mathcal{D}$.
Let $m = 2^p$ with $p \in [4..16]$.

Phase 0: Initialization.
1: Define $\alpha_{16} = 0.673$, $\alpha_{32} = 0.697$, $\alpha_{64} = 0.709$,
2: $\quad \alpha_m = 0.7213/(1 + 1.079/m)$ for $m \geq 128$.
3: Initialize $m$ registers $M[0]$ to $M[m-1]$ to 0.

Phase 1: Aggregation.
4: for all $v \in S$ do
5: $\quad x := h(v)$
6: $\quad idx := \langle x_{31}, \ldots, x_{32-p} \rangle_2$ { First $p$ bits of $x$ }
7: $\quad w := \langle x_{31-p}, \ldots, x_0 \rangle_2$
8: $\quad M[idx] := \max(M[idx], \varrho(w))$
9: end for

Phase 2: Result computation.

10: $E := \alpha_m m^2 \cdot \left( \sum_{j=0}^{m-1} 2^{-M[j]} \right)^{-1}$ { The "raw" estimate }

11: if $E \leq \frac{5}{2}m$ then
12: $\quad$ Let $V$ be the number of registers equal to 0.
13: $\quad$ if $V \neq 0$ then
14: $\quad\quad E^* := \text{LinearCounting}(m, V)$
15: $\quad$ else
16: $\quad\quad E^* := E$
17: $\quad$ end if
18: else if $E \leq \frac{1}{30} 2^{32}$ then
19: $\quad E^* := E$
20: else
21: $\quad E^* := -2^{32} \log(1 - E/2^{32})$
22: end if
23: return $E^*$

Define $\text{LinearCounting}(m, V)$
Returns the LinearCounting cardinality estimate.
24: return $m \log(m/V)$

DISTRIBUTABLE FEATURE ANALYSIS IN MODEL TRAINING SYSTEM

CROSS-REFERENCE TO RELATED APPLICATIONS

The present application claims the benefit of and priority under 35 U.S.C. § 119(e) to U.S. Provisional Patent Application No. 62/936,763 filed Nov. 18, 2019, the entire contents of which are hereby incorporated by reference. The present application also claims the benefit of and priority under 35 U.S.C. § 119(e) to U.S. Provisional Patent Application No. 62/950,344 filed Dec. 19, 2019, the entire contents of which are hereby incorporated by reference.

BACKGROUND

Several machine learning model performance and interpretability techniques rely on the use of transformed variable values also referred to as transformed variable values. Additionally, feature selection is one of the most important steps in practical machine learning and predictive modelling. A key aspect in the performance of feature selection is the generation of transformed variable values.

SUMMARY

In an example embodiment, a computer-readable medium is provided having stored thereon computer-readable instructions that when executed by a computing device, cause the computing device to define a plurality of transformed variable values for training a machine learning model. A data description is determined for each variable of a plurality of variables from a plurality of observation vectors. Each observation vector of the plurality of observation vectors includes a value for each variable of the plurality of variables. A number of rare-levels is determined for any variable of the plurality of variables that has a nominal variable type. A plurality of bins is defined for each variable of the plurality of variables based on the data description determined for each variable of the plurality of variables and based on the number of rare-levels determined for any variable of the plurality of variables identified as the nominal variable type. The defined plurality of bins describes a cumulative distribution function for a respective variable. A transformed value is determined for each variable of the plurality of variables and for each observation vector of the plurality of observation vectors using the plurality of bins defined for a respective variable of the plurality of variables. Each determined transformed value is written to a transformed dataset with a respective observation vector of the plurality of observation vectors.

In another example embodiment, a system is provided. The system includes, but is not limited to, a processor and a computer-readable medium operably coupled to the processor. The computer-readable medium has instructions stored thereon that, when executed by the processor, cause the system to define a plurality of transformed variable values for training a machine learning model.

In yet another example embodiment, a method of defining a plurality of transformed variable values for training a machine learning model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2A, 2B, 2C, and 2D depict a flow diagram illustrating examples of operations performed by a model training application of the model training device of FIG. 1 in accordance with an illustrative embodiment.

FIG. 11 shows a mean and standard deviation for each bin of a plurality of bins defined for the interval variable from the quantile computation of FIG. 10 in accordance with an illustrative embodiment.

FIG. 17 shows pseudo code for a hyper-log-log algorithm used to compute statistics for a nominal variable in accordance with an illustrative embodiment.

DETAILED DESCRIPTION

Feature selection is one of the most important steps in practical machine learning and predictive modelling. This is especially true for modern machine learning problems that include datasets with significant data quality problems. One of the key data quality issues is the occurrence of too many features that have negligible correlation with the target and, as a result, are not relevant variables for training a machine learning model. Among the techniques that are applied to identify relevant features, the permutation-importance approach is one of the most effective. The key characteristic of this approach is the generation and consumption of transformed variable values. In fact, due to the need to generate multiple transformed variable values for each input variable, the transformed variable values generation step has the potential to be a bottleneck when variable importance is applied to big, distributed data.

The application of transformed variable values to machine learning interpretability and performance is also well established. In these approaches, local and global explanations are produced by systematically generating and consuming transformed variable values of a predefined number of records along with the rest of the variables in an approach-specific way.

Computation of the transformed variable values as described herein addresses the critical scalability issues for distributed data. The standard (naïve) generation of transformed variable values involves distributed sorting, which is known to be one of the most computationally expensive tasks for distributed platforms. However, for both relevant feature selection and model interpretability, the only requirement is that the transformed variable values have approximately the same empirical frequency/cumulative distribution. Computation of the transformed variable values as described herein relies on this insight to solve the problem by computing variable data descriptions that are small packets of information that describe the input features and that are subsequently used to generate the transformed variable values. This enables computation of the transformed variable values as described herein to be scalable and distributed unlike existing methods.

Figure 1:
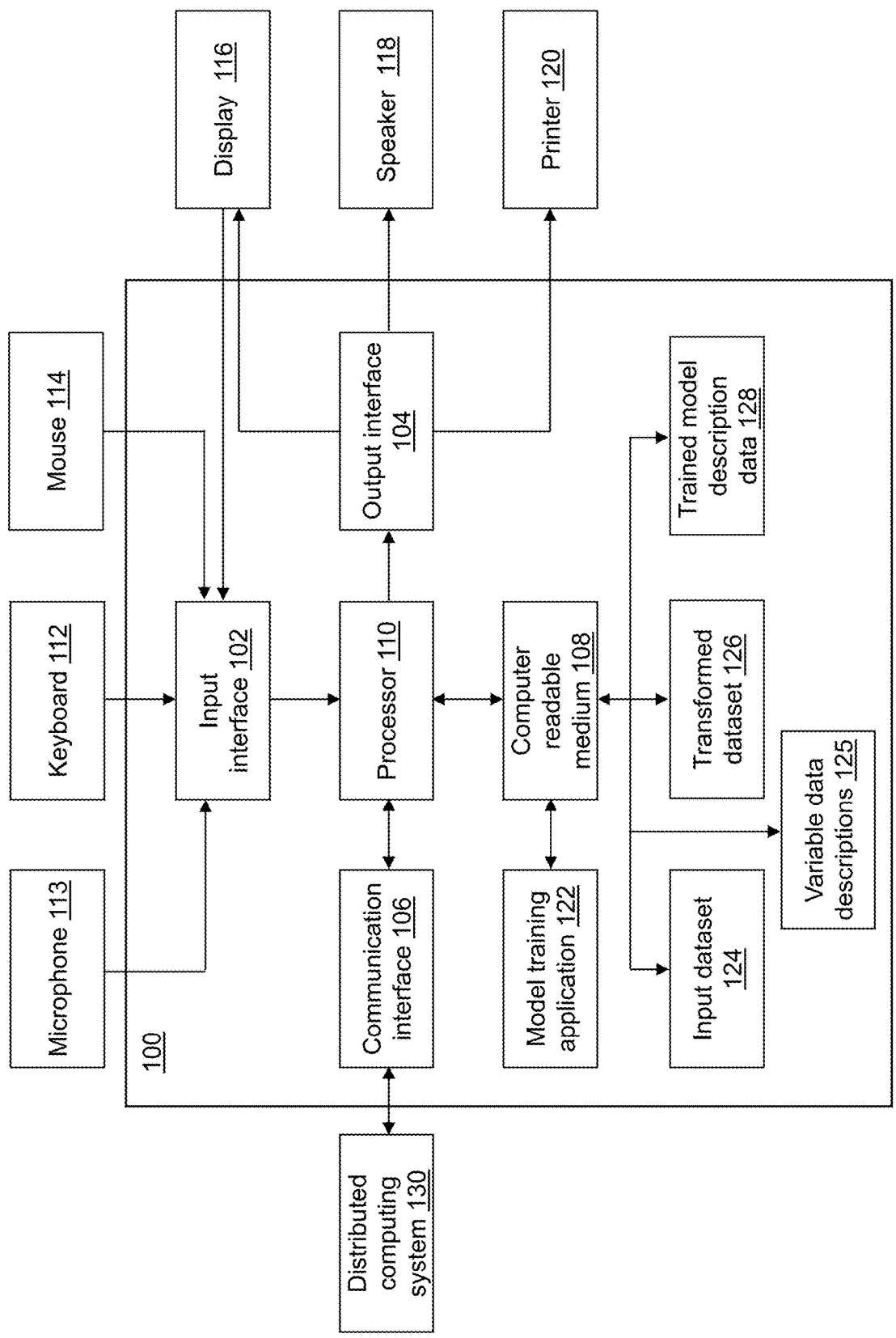
FIG. 1 depicts a block diagram of a model training device in accordance with an illustrative embodiment.

Referring to FIG. 1, a block diagram of a model training device 100 is shown in accordance with an illustrative embodiment that computes transformed variable values to define a transformed dataset 126 from an input dataset 124 using variable data descriptions 125. Using transformed dataset 126, model training device 100 can select the relevant variables from input dataset 124 and train a model using the selected relevant variables. Model training device 100 may include an input interface 102, an output interface 104, a communication interface 106, a non-transitory computer-readable medium 108, a processor 110, a model training application 122, input dataset 124, variable data descriptions 125, transformed dataset 126, and a trained model description data 128. Fewer, different, and/or additional components may be incorporated into model training device 100.

Input interface 102 provides an interface for receiving information from the user or another device for entry into model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into model training device 100 or to make selections presented in a user interface displayed on display 116.

The same interface may support both input interface 102 and output interface 104. For example, display 116 comprising a touch screen provides a mechanism for user input and for presentation of output to the user. Model training device 100 may have one or more input interfaces that use the same or a different input interface technology. The input interface technology further may be accessible by model training device 100 through communication interface 106.

Output interface 104 provides an interface for outputting information for review by a user of model training device 100 and/or for use by another application or device. For example, output interface 104 may interface with various output technologies including, but not limited to, display 116, a speaker 118, a printer 120, etc. Model training device 100 may have one or more output interfaces that use the same or a different output interface technology. The output interface technology further may be accessible by model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model training device 100 may have one or more communication interfaces that use the same or a different communication interface technology. For example, model training device 100 may support communication using an Ethernet port, a Bluetooth antenna, a telephone jack, a USB port, etc. Data and/or messages may be transferred between model training device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model training device 100 also may have one or more drives that support the loading of a memory media such as a CD, DVD, an external hard drive, etc. One or more external hard drives further may be connected to model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Model training application 122 performs operations associated with defining transformed dataset 126 from data stored in input dataset 124 and with training a model stored in trained model description data 128 with relevant variables identified from input dataset 124. Information stored in trained model description data 128 may be used to predict a value for data stored in a second dataset 1524 (shown referring to FIG. 15). In an alternative embodiment, model training application 122 may not train a model with relevant variables identified from input dataset 124. Instead, model training application 122 may identify the relevant variables in input dataset 124 without then training the model or storing the model in trained model description data 128. Some or all of the operations described herein may be embodied in model training application 122. The operations may be implemented using hardware, firmware, software, or any combination of these methods.

Referring to the example embodiment of FIG. 1, model training application 122 is implemented in software (comprised of computer-readable and/or computer-executable instructions) stored in computer-readable medium 108 and accessible by processor 110 for execution of the instructions that embody the operations of model training application 122. Model training application 122 may be written using one or more programming languages, assembly languages, scripting languages, etc. Model training application 122 may be integrated with other analytic tools. As an example, model training application 122 may be part of an integrated data analytics software application and/or software architecture such as that offered by SAS Institute Inc. of Cary, N.C., USA. Merely for illustration, model training application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Model training application 122 may be implemented as a Web application. For example, model training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables or features. In an alternative embodiment, input dataset 124 may be transposed. The plurality of variables define a vector $x_i$ for each observation vector i=1, 2, . . . , n, where n is a number of the observation vectors included in input dataset 124. Input dataset 124 may include additional variables that are not included in the plurality of variables. Input dataset 124 may include a $y_i$-variable (target) value that indicates a target value related to the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc. Zero or more observations included in input dataset 124 may include the $y_i$-variable (target) value. As a result, input dataset 124 may include supervised data, partially supervised data, or unsupervised data.

One or more variables of the plurality of variables may describe a characteristic of a physical object. For example, if input dataset 124 includes data related to operation of a vehicle, the variables may include a type of vehicle, an oil pressure, a speed, a gear indicator, a gas tank level, a tire pressure for each tire, an engine temperature, a radiator level, etc.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing or streamed to model training device 100 as it is generated. Input dataset 124 may include data captured as a function of time for one or more physical objects. The data stored in input dataset 124 may be captured at different time points periodically, intermittently, when an event occurs, etc. Input dataset 124 may include data captured at a high data rate such as 200 or more observation vectors per second for one or more physical objects. One or more columns of input dataset 124 may include a time and/or date value. Input dataset 124 may include data captured under normal and abnormal operating conditions of the physical object.

The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Each variable of input dataset 124 may be associated with a type of data that may be indicated as either an interval variable type or a nominal variable type. The nominal variable type is used to identify variables that do not include a quantitative value, while the interval variable type is used to identify variables that include a quantitative value. The nominal variable type further may have a high-cardinality indicating that there are large number of unique values for the nominal variable defined in input dataset 124.

Input dataset 124 may be stored on computer-readable medium 108 or on one or more computer-readable media of distributed computing system 130 and accessed by model training device 100 using communication interface 106, input interface 102, and/or output interface 104. Input dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input dataset 124 may be stored using various data structures as known to those skilled in the art including one or more files of a file system, a relational database, one or more tables of a system of tables, a structured query language database, etc. on model training device 100 or on distributed computing system 130. Model training device 100 may coordinate access to input dataset 124 that is distributed across distributed computing system 130 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS Viya open, cloud-ready, in-memory architecture also may be used as an analytic platform to enable multiple users to concurrently access data stored in input dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
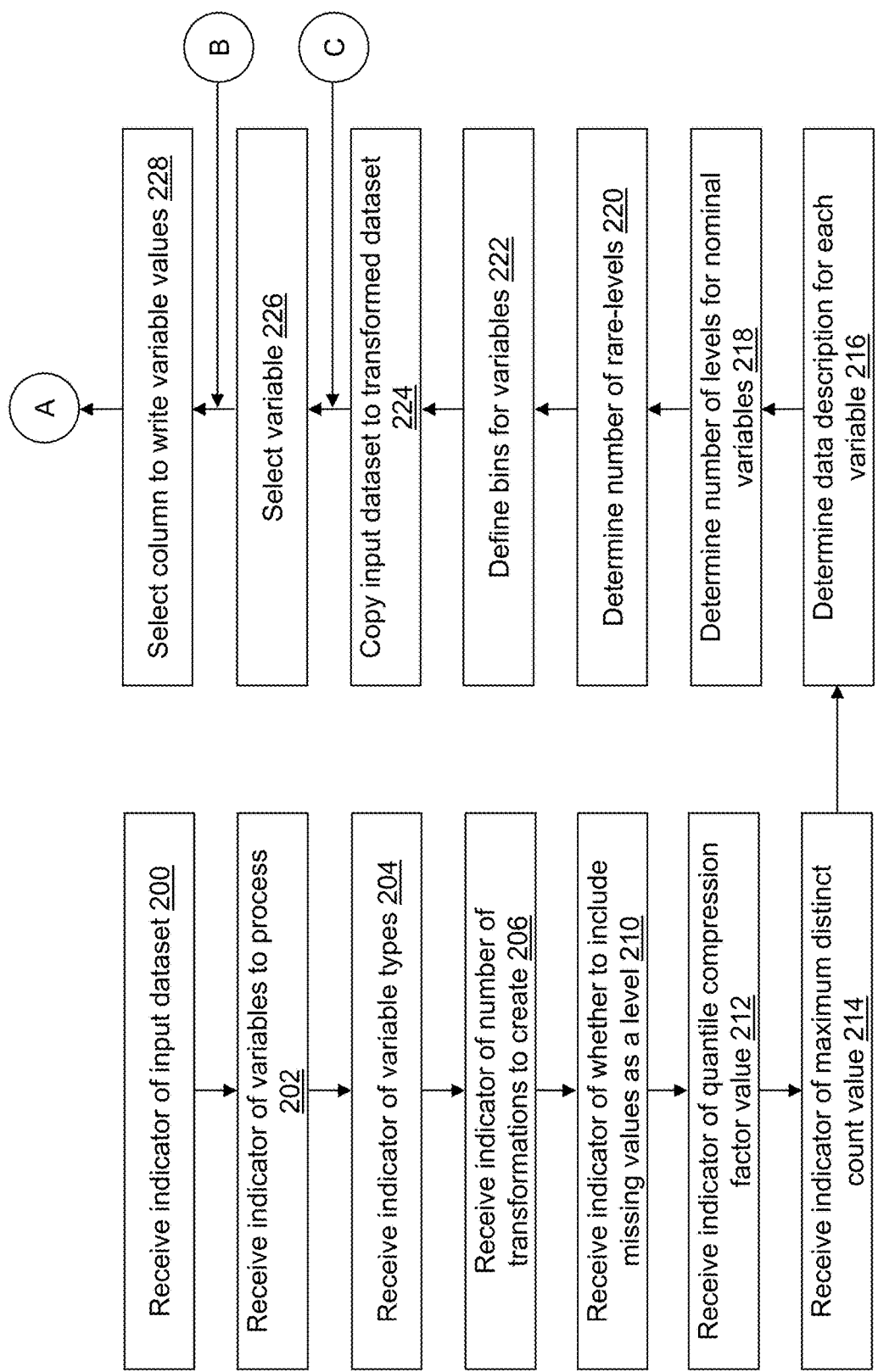

Referring to FIGS. 2A, 2B, 2C, and 2D, example operations associated with model training application 122 are described when input dataset 124 is stored on model training device 100. Additional, fewer, or different operations may be performed depending on the embodiment of model training application 122. The order of presentation of the operations of FIGS. 2A, 2B, 2C, and 2D is not intended to be limiting. For example, FIG. 2D shows an alternate processing order relative to FIG. 2B. Some of the operations may not be performed in some embodiments. Although some of the operational flows are presented in sequence, the various operations may be performed in various repetitions and/or in other orders than those that are illustrated, for example, using a plurality of threads. For example, a user may execute model training application 122, which causes presentation of a first user interface window, which may include a plurality of menus and selectors such as drop-down menus, buttons, text boxes, hyperlinks, etc. associated with model training application 122 as understood by a person of skill in the art. The plurality of menus and selectors may be accessed in various orders. An indicator may indicate one or more user entries from a user interface, one or more data entries into a data field of the user interface, one or more data items read from computer-readable medium 108 or otherwise defined with one or more default values, etc. that are received as an input by model training application 122 and/or one or more data items defined in model training application 122.

Referring to FIG. 2A, in an operation 200, a first indicator may be received that indicates input dataset 124. For example, the first indicator indicates a location and a name of input dataset 124. As an example, the first indicator may be received by model training application 122 after selection from a user interface window or after entry by a user into a user interface window. In an alternative embodiment, input dataset 124 may not be selectable. For example, a most recently created dataset may be used automatically.

In an operation 202, a second indicator may be received that indicates the plurality of variables to process from input dataset 124. For example, the second indicator may indicate one or more column numbers or one or more column names. As another option, all of the columns of input dataset 124 may be assumed to be the plurality of variables. The plurality of variables are the variables that define each observation vector $x_i$. A number of the plurality of variables may be indicated by d.

In an operation 204, a third indicator of a variable type for each of the plurality of variables may be received to indicate whether a respective variable is the interval variable type or the nominal variable type. In an alternative embodiment, the third indicator may not be received. For example, each variable may be assumed to be the interval variable type or the nominal variable type.

In an operation 206, a fourth indicator of a number of transformations to create $N_{tx}$ for each variable of the plurality of variables may be received. In an alternative embodiment, the fourth indicator may not be received. For example, a default value may be stored, for example, in computer-readable medium 108 and used automatically. In another alternative embodiment, the value of the number of transformations to create $N_{tx}$ may not be selectable. Instead, a fixed, predefined value may be used. For illustration, a default value of the number of transformations to create $N_{tx}$ may be five though other values may be used.

In an operation 210, a fifth indicator of whether to include missing values as a distinct level for variables having the nominal variable type may be received. In an alternative embodiment, the fifth indicator may not be received. For example, a default value may be stored, for example, in computer-readable medium 108 and used automatically. In another alternative embodiment, the indicator of whether to include missing values as a distinct level may not be selectable. Instead, a fixed, predefined value may be used. For illustration, a default indicator of whether to include missing values as a distinct level may be TRUE though other values may be used.

In an operation 212, a sixth indicator of a quantile compression factor value may be received. In an alternative embodiment, the sixth indicator may not be received. For example, a default value may be stored, for example, in computer-readable medium 108 and used automatically. In another alternative embodiment, the value for the quantile compression factor value may not be selectable. Instead, a fixed, predefined value may be used. For illustration, a default value for the quantile compression factor value may be 0.001 though other values may be used.

In an operation 214, a seventh indicator of a maximum distinct count value may be received. In an alternative embodiment, the seventh indicator may not be received. For example, a default value may be stored, for example, in computer-readable medium 108 and used automatically. In another alternative embodiment, the value for the maximum distinct count value may not be selectable. Instead, a fixed, predefined value may be used. For illustration, a default value for the maximum distinct count value may be 10,000 though other values may be used.

Figure 10:
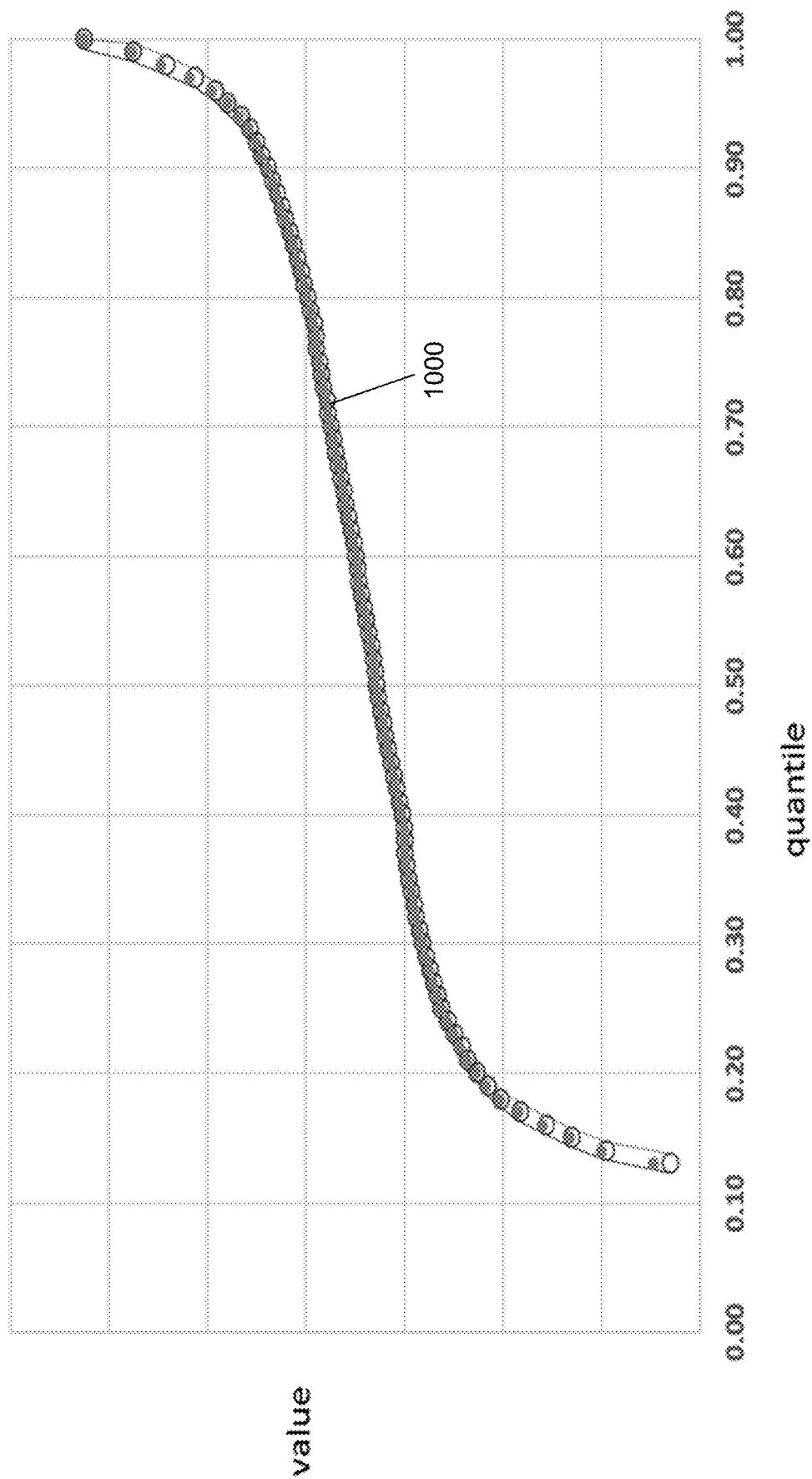
FIG. 10 shows a quantile computation for an interval variable in accordance with an illustrative embodiment.

In an operation 216, a data description may be determined for each variable of the plurality of variables, where $DD_j$, j=1, 2, . . . , d is a data description for a $j^{th}$ variable of the plurality of variables. The data description for each variable having the interval variable type may include cumulative quantile data determined from the values included for each observation vector value of the respective variable, which is the column of data that stores the values for the respective variable in input dataset 124. For example, the cumulative quantile data may be determined using the method described in Algorithm 1 on page 9 of Ted Dunning and Otmar Ertl, *Computing Extremely Accurate Quantiles Using t-Digests*, (2091) published online at https://arxiv.org/pdf/1902.04023.pdf. The cumulative quantile data defines the cumulative distribution for each respective variable of the plurality of variables. The quantile compression factor value indicated in operation 212 is used to determine the cumulative quantile data for each variable of the plurality of variables having the interval variable type. For illustration, the cumulative quantile data may be stored for a plurality of bins defined based on the quantile compression factor value. For illustration, referring to FIG. 10, a quantile curve 1000 is shown that represents the cumulative quantile data for a first interval variable. For example, a cumulative quantile value that is between zero and one and an associated variable value may be defined for each data point in quantile curve 1000. The cumulative quantile data may be stored using various data structures such as a two-dimensional array.

The data description for each variable having the nominal variable type may include frequency data for each unique value read from the values included for each observation vector value of the respective variable, which is the column of data that stores the values for the respective variable in input dataset 124, up to the maximum distinct count value indicated in operation 214. When missing values are to be treated as a distinct level based on the indicator received in operation 210 to include missing values as a distinct level, frequency data is maintained for missing values of the respective variable. A frequency value for values of the respective variable that exceed the maximum distinct count value is maintained, for example, as a last value of the frequency data. For example, the frequency data may be stored in various data structures such as an array.

For example, the frequency data may be determined using the method described in a paper by Misra, J.; Gries, David, *Finding repeated elements*, Science of Computer Programming 2 (2) 143-152 (1982) referred to herein as the Misra-Gries algorithm. Pseudo code for the Misra-Gries algorithm is provided below where k is the maximum distinct count value indicated in operation 214:

algorithm misra-gries:
  input:
    A positive integer k
    A finite sequence s taking values in the range 1, 2, . . . , m
  output: An associative array A with frequency estimates for each item in s
  A:=new (empty) associative array
  while s is not empty:
    take a value i from s
    if i is in keys(A):
      A[i]:=A[i]+1
    else if |keys(A)|<k−1:
      A[i]:=1
    else:
      for each K in keys(A):
        A[K]:=A[K]−1
        if A[K]=0:
          remove K from keys(A)
  return A A cardinality estimate is determined for each variable having the nominal variable type using the method described in a paper by Stefan Heule, Marc Nunkesser, and Alexander Hall, *HyperLogLog in practice: algorithmic engineering of a state of the art cardinality estimation algorithm*, In Proceedings of the 16th International Conference on Extending Database Technology (EDBT '13) 683-692 (ACM, New York, N.Y. 2013) referred to herein as the HLL algorithm. Pseudo code 1700 for the HLL algorithm is shown referring to FIG. 17. For example, in a linear counting regime where nonlinearity/distortions are not important, the cardinality estimate for each variable is the value of m $\log^m$/V. For other regimes, the value of E* as defined in the HLL algorithm shown referring to FIG. 17 may be used.

The Misra-Gries algorithm and the HLL algorithm are both applied to each variable having the nominal variable type as each row is read from input dataset 124. The quantile computations are also performed on variable values for each variable having the interval variable type as each row is read from input dataset 124 so that a single read of input dataset 124 is required to compute the plurality of data descriptions $DD_j$, j=1, 2, ..., d. For example, each computation may be performed in parallel using a plurality of threads.

In an operation 218, a number of levels for each variable having the nominal variable type is determined from the frequency data computed using the Misra-Gries algorithm. For example, the number of levels for each variable is the number of entries in keys(A).

In an operation 220, a number of rare-levels is determined for each variable having the nominal variable type as a difference between the cardinality estimate computed using the HLL algorithm and the number of levels computed using the Misra-Gries algorithm and may be zero when the number of levels is less than or equal to the maximum distinct count value indicating that there are no rare-levels for the respective variable.

In an operation 222, a plurality of bins is defined for each variable having the interval variable type from the cumulative quantile data. For example, for each bin, a minimum value, a maximum value, a mean value, and a standard deviation value associated with the variable values in each bin are defined for each variable having the interval variable type. For illustration, referring to FIG. 11, a table 1100 that includes a mean value and a standard deviation for each bin of the plurality of bins defined for an interval variable using the values that are included within the boundary of each bin. For example, table 1100, includes a variable name column 1102, a bin identifier column 1104, a lower bin boundary column 1106, an upper bin boundary column 1108, a bin width column 1110, a bin count column 1112, a mean value column 1114, a standard deviation value column 1116, a minimum value column 1118, and a maximum value column 1120.

The plurality of bins may be defined for each variable having the interval variable type using the plurality of data descriptions $DD_j$, j=1, 2, ..., d determined in operation 216. For example, interval cut point values are determined for each bin with a lower bin boundary for a first bin starting at an overall minimum value, and an upper bin boundary for a last bin ending at an overall maximum value. A first cut point value is an average of a maximum value of the first bin and a minimum value of a second bin, second cut point value is an average of a maximum value of the second bin and a minimum value of a third bin, and so on for each successive bin to define Bin 1 as (overall minimum value, first cut point value), Bin 2 as (first cut point value, second cut point value), ..., Bin $N_b$ as ($N_b$−1 cut point value, overall maximum value), where $N_b$ is a number of bins determined by a number of centroids of the cumulative quantile data.

Figure 12:
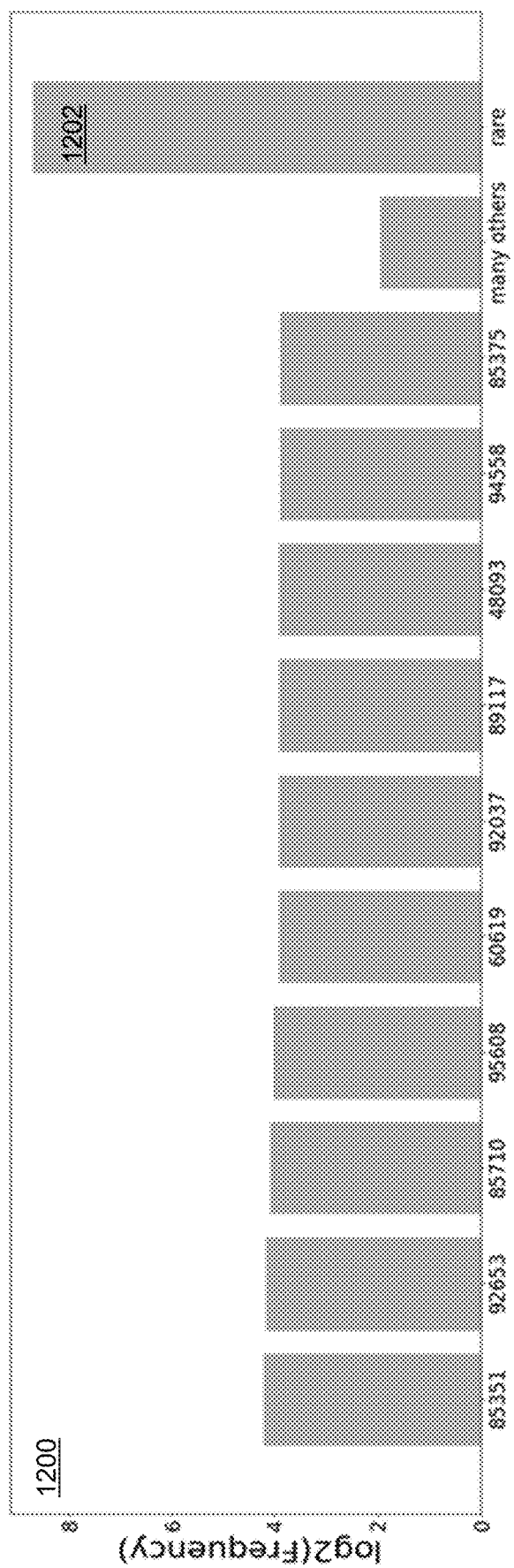
FIG. 12 shows a plurality of bins defined for a nominal variable in accordance with an illustrative embodiment.

A plurality of bins is also defined for each variable having the nominal variable type from the frequency data. For example, a bin is defined for each level including a rare-level when the number of rare-levels is greater than zero, where a bin can be associated with each level of the frequency data in any order except that the rare-level is the last level, when it exists. For illustration, referring to FIG. 12, a plurality of bins 1200 is shown for a nominal variable that includes a rare bin 1202 that is included last. Each non-rare-level bin may include a frequency estimate and an actual raw value for a respective bin. When the number of unique values is greater than the maximum distinct count value, the aggregated rare-level bin includes the value of the number of rare-levels determined in operation 220.

A cumulative value is computed for each successive bin in the defined order by adding the frequency data for a current bin to the value of a previous bin until all of the frequencies have been included including the rare-level. Successive cumulative values define the bin boundaries and are standardized to be between zero and one by dividing by a total number of values of the respective variable. The cumulative value and an associated numeric value may be defined for each bin that may be stored using various data structures such as a two-dimensional array. The numeric value may not be a specific raw value read for a respective nominal variable. Instead, the numeric value may be from one to the number of levels defined for the nominal variable plus a single rare-level numeric value when the number of rare-levels is greater than zero and may be used as an index. For example, successive integral numeric values may be assigned to each raw value in the frequency data in any order.

Computation of the transformed values for nominal variable types is scalable because only a subset of the unique values of the nominal variable types is maintained when the nominal variable has a high-cardinality as defined by having a number of unique values that is greater than the maximum distinct count value. Only the non-rare-levels and an aggregated rare-level along with their frequency information is stored. The applications that use the transformed values are not affected by the use of integral numeric values instead of the raw values.

In an operation 224, the columns of data of input dataset 124 that are associated with the plurality of variables to process indicated in operation 202 are copied into transformed dataset 126 including the column associated with the target variable, if any.

In an operation 226, a variable is selected from the plurality of variables. For example, a first variable is selected on a first iteration of operation 226; a second variable is selected on a second iteration of operation 226; ..., and a $d^{th}$ variable is selected on a $d^{th}$ iteration of operation 226.

Figure 2B:
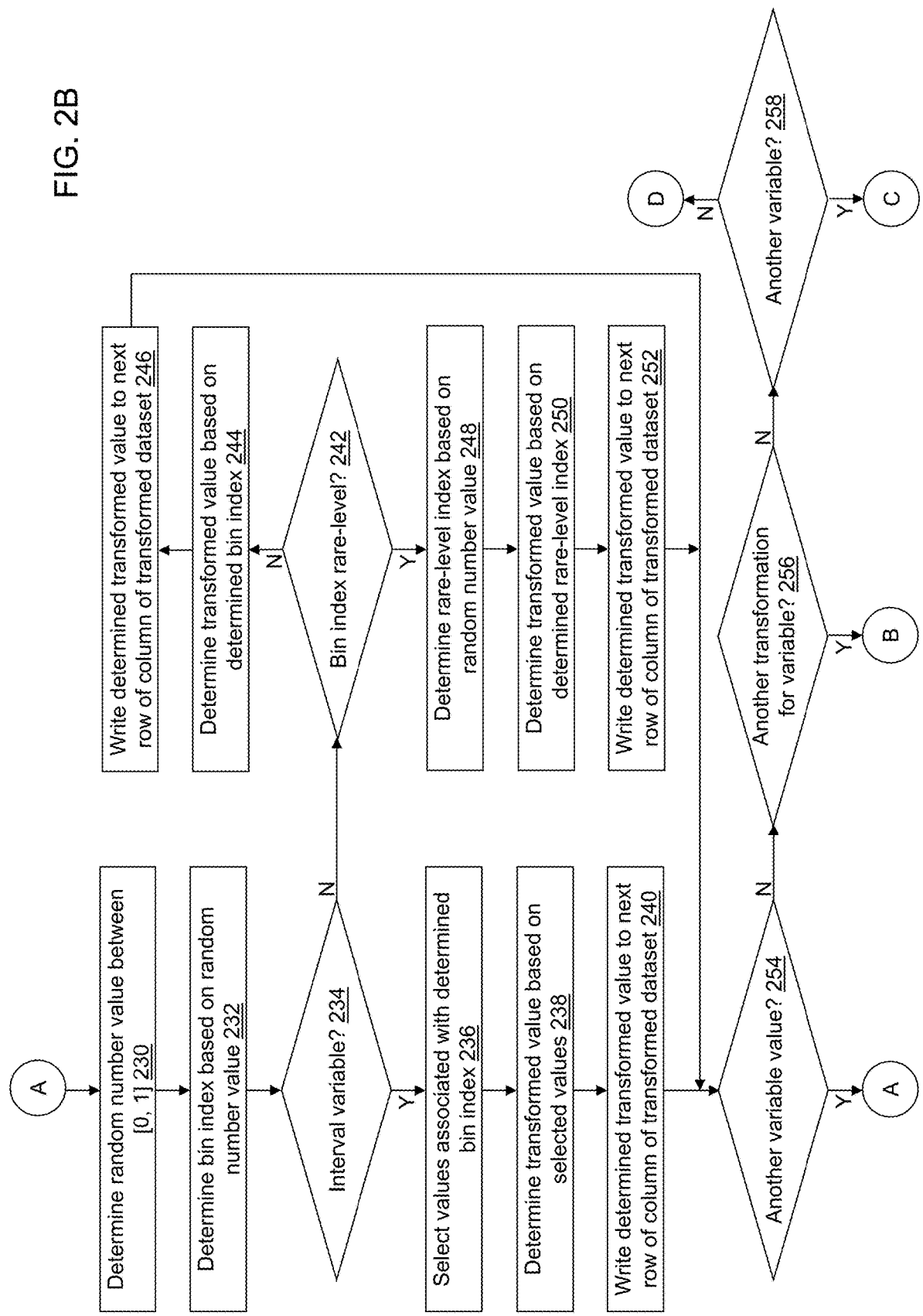

In an operation 228, a column is selected in transformed dataset 126 to store the transformed variable data values, and processing continues in an operation 230 shown referring to FIG. 2B. For example, a new column is added to transformed dataset 126 for each iteration of operation 228.

Referring to FIG. 2B, in operation 230, a random number value is drawn from a uniform random number distribution between zero and one inclusive.

In an operation 232, a bin index is determined using the random number value either with the plurality of bins defined from the cumulative quantile data when the variable type for the selected variable has the interval variable type or with the plurality of bins defined using the frequency data from the Misra-Gries method when the variable type for the selected variable has the nominal variable type.

In an operation 234, a determination is made concerning whether the selected variable is an interval variable. When the selected variable is an interval variable, processing continues in an operation 236. When the selected variable is not an interval variable, processing continues in an operation 242.

In operation 236, the mean value, the standard deviation value, the minimum bin value, and the maximum bin value associated with the bin index are selected.

In an operation 238, a transformed value is determined based on the selected mean value, standard deviation value, minimum bin value, and maximum bin value. For example, the transformed value is a random number value drawn from a bounded Gaussian random distribution using the selected mean value and standard deviation value bounded by the selected minimum bin value and maximum bin value.

Figure 13A:
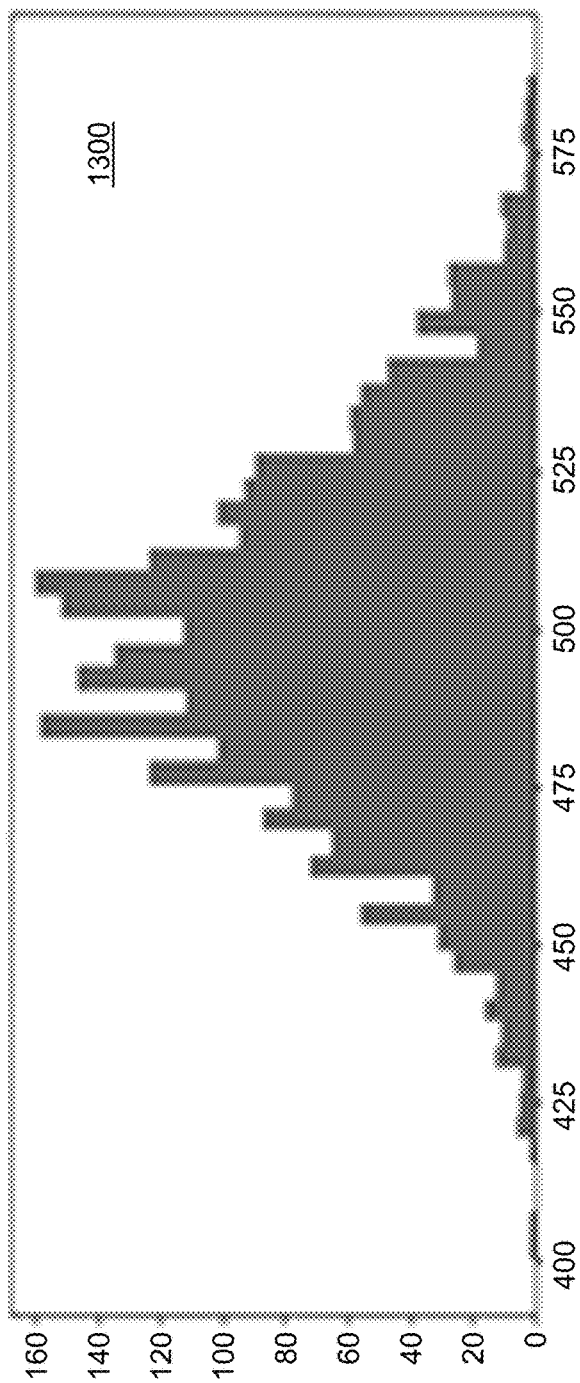
FIG. 13A shows a first histogram for an original variable in an input dataset in accordance with an illustrative embodiment.
Figure 13B:
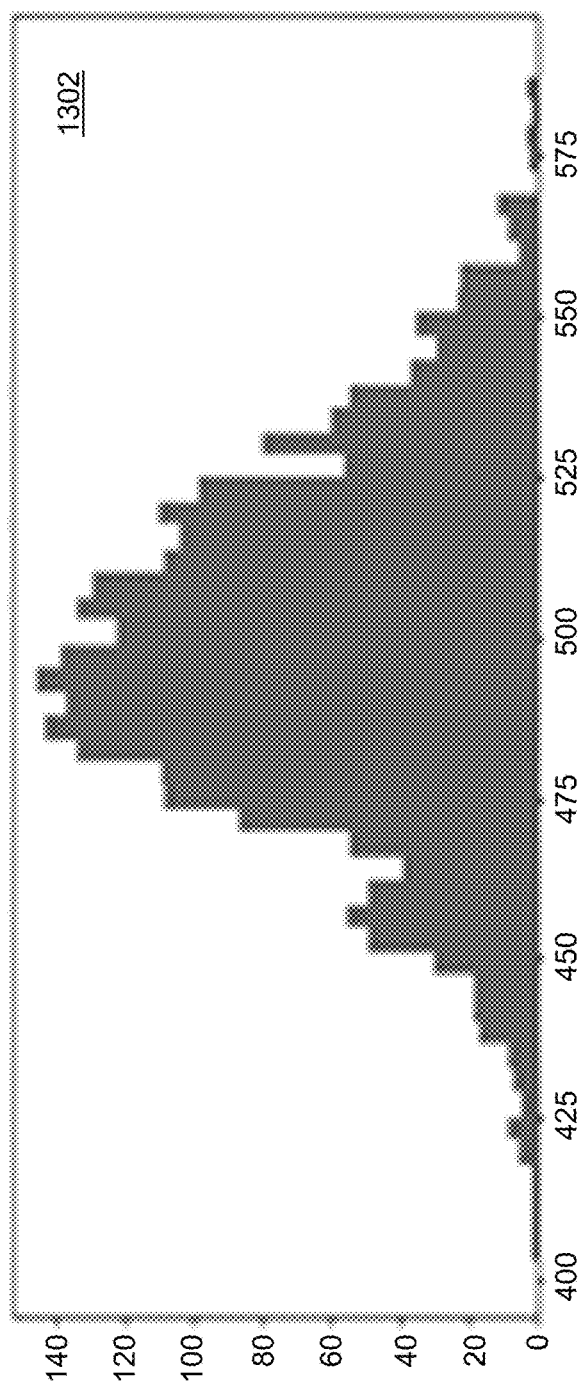
FIG. 13B shows a second histogram for a first transformed variable computed based on statistics computed for the original variable of FIG. 13A in accordance with an illustrative embodiment.
Figure 13C:
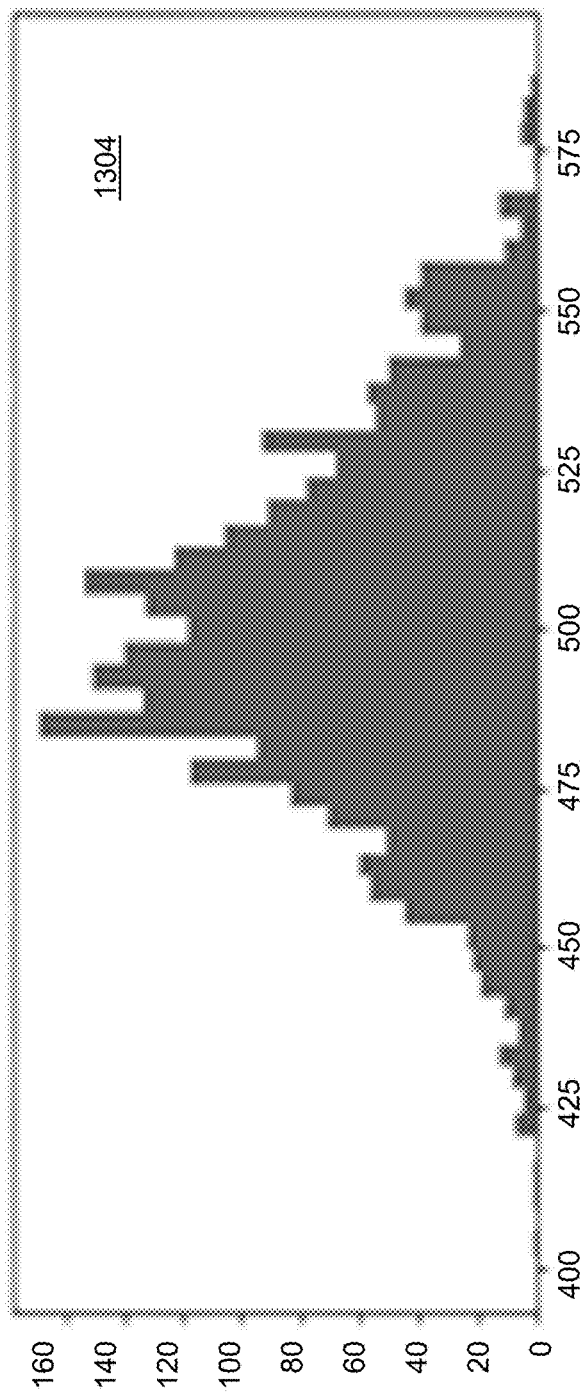
FIG. 13C shows a third histogram for a second transformed variable computed based on statistics computed for the original variable of FIG. 13A in accordance with an illustrative embodiment.
Figure 13D:
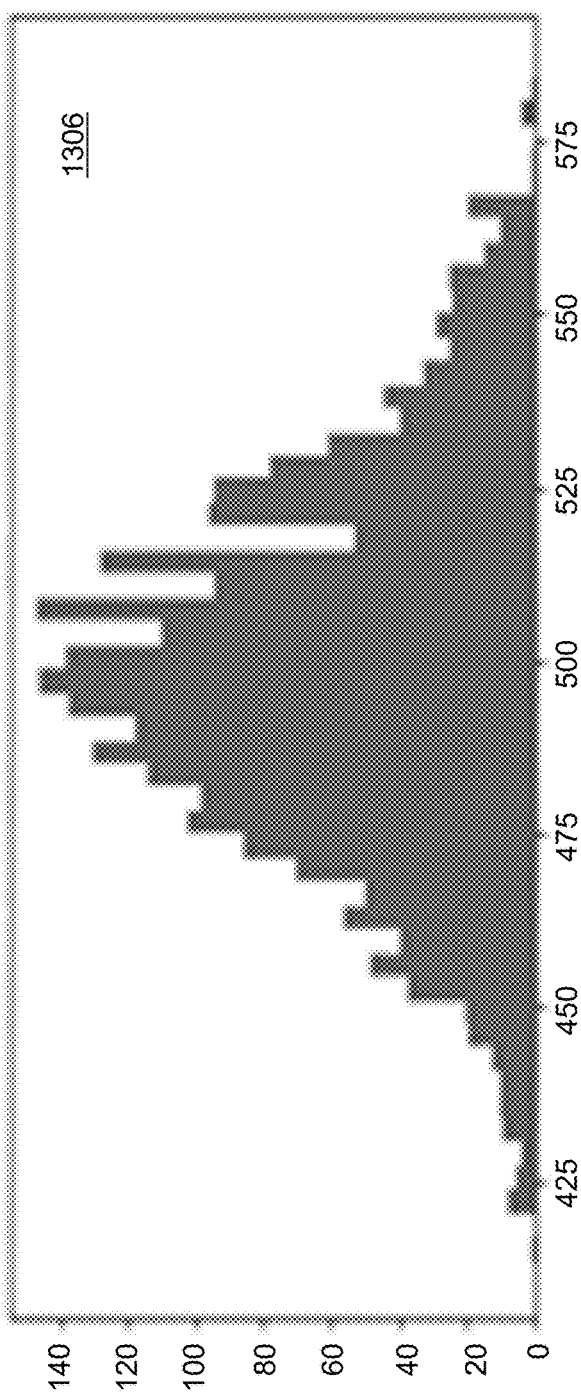
FIG. 13D shows a fourth histogram for a third transformed variable computed based on statistics computed for the original variable of FIG. 13A in accordance with an illustrative embodiment.

In an operation 240, the determined transformed value is stored in a next row of the selected column, and processing continues in operation 254. For illustration, referring to FIG. 13A, a first histogram 1300 shows first interval variable values for a first interval variable selected from input dataset 124. Referring to FIG. 13B, a second histogram 1302 shows first transformed variable values for the first interval variable selected from input dataset 124 for operations 230 to 240 and 254 executed until the number of the plurality of observation vectors n was processed after a first iteration of operation 228. Referring to FIG. 13C, a third histogram 1304 shows second transformed variable values for the first interval variable selected from input dataset 124 for operations 228 to 240 and 254 executed until the number of the plurality of observation vectors n was processed after a second iteration of operation 228. Referring to FIG. 13D, a fourth histogram 1306 shows third transformed variable values for the first interval variable selected from input dataset 124 for operations 228 to 240 and 254 executed until the number of the plurality of observation vectors n was processed after a third iteration of operation 228. The first histogram 1300, the second histogram 1302, the third histogram 1304, and the fourth histogram 1306 have approximately the same empirical frequency distribution.

In an operation 242, a determination is made concerning whether the determined bin index indicates the rare-level bin index. When the determined bin index indicates the rare-level bin index, processing continues in an operation 248. When the determined bin index does not indicate the rare-level bin index, processing continues in an operation 244. When the selected variable that has the nominal variable type does not have a high-cardinality, the rare-level bin index is never drawn. For illustration, the rare-level bin index may be greater than the maximum distinct count value.

In operation 244, a transformed value is determined as the numeric value associated with the determined bin index.

In an operation 246, the determined transformed value is stored in a next row of the selected column, and processing continues in operation 254.

In operation 248, a rare-level index is determined. For example, the rare-level index is determined as a random number value drawn from a uniform random number distribution between one and the determined number of rare-levels inclusive.

In an operation 250, a transformed value is determined based on a numeric value that is the determined rare-level index plus the number of levels of the selected variable.

In an operation 252, the determined transformed value is stored in a next row of the selected column, and processing continues in operation 254.

In operation 254, a determination is made concerning whether another variable value is to be determined and added to the selected column. For example, a variable value is added for each observation vector included in input dataset 124. A counter can be used and compared to the number of the plurality of observation vectors n to determine when another variable value is added. When another variable value is to be determined, processing continues in operation 230. When another variable value is not to be determined, processing continues in an operation 256. As a result, the number of the plurality of observation vectors n defines a number of times that operation 230 is repeated.

In operation 256, a determination is made concerning whether another transformation is to be determined for the selected variable. For example, whether another transformation is to be determined is based on the number of transformations to create indicated in operation 206. A second counter can be used and compared to the number of transformations to create $N_{tx}$ to determine when another transformation column is added to transformed dataset 126. When another transformation is to be determined, processing continues in operation 228. When another transformation is not to be determined, processing continues in an operation 258. As a result, the number of transformations to create $N_{tx}$ defines a number of times that operation 228 is repeated.

In operation 258, a determination is made concerning whether another variable is to be processed. For example, each variable of the plurality of variables indicated in operation 202 is processed. A third counter can be used and compared to the number of the plurality of variables d to determine when another variable column is added to transformed dataset 126. When another variable is to be processed, processing continues in operation 226. When another variable value is not to be processed, processing continues in an operation 260 shown referring to FIG. 2C. As a result, the number of the plurality of variables d defines a number of times that operation 226 is repeated.

Once operation 260 is reached, creation of transformed dataset 126 is complete. Transformed dataset 126 includes a number of columns $N_c$ defined by $N_c=d+N_{tx}*d$. When input dataset 124 includes a $y_t$-variable (target) value for one or more observation vectors, transformed dataset 126 includes a number of columns defined by $N_c=N_c+1$. Transformed dataset 126 includes a number of columns $N_c$ with observation vector values defined for each of the plurality of observation vectors n. The operations of FIGS. 2A and 2B describe writing to transformed dataset 126 by writing down each row before adding a next column. However, the looping created by operations 254, 256, and 258 can be performed in different orders. For example, referring to FIG. 2D, operation 256 is performed before operation 258, which is performed before operation 254, resulting in all of the columns being written one row at a time.

In operation 260, an eighth indicator indicates a model type. For example, the eighth indicator indicates a name of a model type that performs prediction and/or classification. The eighth indicator may be received by model training application 122 from a user interface window or after entry by a user into a user interface window. A default value for the model type may further be stored, for example, in computer-readable medium 108. As an example, a model type may be selected from "SVM", "K-Cluster", "Neural Network", "Logistic Regression", "Forest", "Gradient Boosting", "Decision Tree", "Factorization Machine", etc. The model type indicated by "SVM" may refer to a support vector machine (SVM) model type. The model type indicated by "K-Cluster" may refer to a k-means clustering model type. The model type indicated by "Neural Network" may refer to a neural network model type. The model type indicated by "Logistic Regression" may refer to a logistic regression model type. The model type indicated by "Forest" may refer to a random forest model type. The model type indicated by "Gradient Boosting" may refer to a gradient boosting model type. The model type indicated by "Decision Tree" may refer to a decision tree model type. The model type indicated by "Factorization Machine" may refer to a factorization machine model type. For example, a default model type may be indicated by "Gradient Boosting". Of course, the model type may be labeled or selected in a variety of different manners by the user as understood by a person of skill in the art. In an alternative embodiment, the model type may not be selectable, and a single model type is implemented by model training application 122. For example, the model type indicated as "Forest" may be used by default or without allowing a selection.

In an operation 262, a ninth indicator of one or more hyperparameters to use for training and validating the indicated model type and/or specified values for an automatic tuning method (autotune option) are received. Hyperparameters define values or various options that govern a training process based on the model type. The default values of these hyperparameters may not be suitable for all applications. To reduce the effort in adjusting these hyperparameters, an automatic tuning process may be used to identify the best settings for the hyperparameters though the hyperparameters may optionally be selected as an input option by a user.

In an operation 264, a model is trained using each observation vector read from transformed dataset 126 based on the model type indicated in operation 260 and the hyperparameters indicated in operation 262. For example, the model may be trained and validated using another application that is distinct from model training application 122 or is integrated with model training application 122. For illustration, a TREESPLIT Procedure included in SAS® Visual Data Mining and Machine Learning 8.1: Statistical Procedures developed and provided by SAS Institute Inc. of Cary, N.C., USA may be used for a decision tree model type; a FACTMAC procedure included in SAS® Visual Data Mining and Machine Learning 8.1: Data Mining and Machine Learning Procedures developed and provided by SAS Institute Inc. of Cary, N.C., USA may be used for a factorization machine model type; a FOREST procedure included in SAS® Visual Data Mining and Machine Learning 8.1: Data Mining and Machine Learning Procedures developed and provided by SAS Institute Inc. of Cary, N.C., USA may be used for a random forest model type; a GRADBOOST procedure included in SAS® Visual Data Mining and Machine Learning 8.1: Data Mining and Machine Learning Procedures developed and provided by SAS Institute Inc. of Cary, N.C., USA may be used for a gradient boosting model type; a NNET procedure included in SAS® Visual Data Mining and Machine Learning 8.1: Data Mining and Machine Learning Procedures developed and provided by SAS Institute Inc. of Cary, N.C., USA may be used for a gradient boosting model type; a SVMACHINE procedure included in SAS® Visual Data Mining and Machine Learning 8.1: Data Mining and Machine Learning Procedures developed and provided by SAS Institute Inc. of Cary, N.C., USA may be used for a support vector machine model type; a HPLOGISTIC procedure included in SAS/STAT® 15.1 developed and provided by SAS Institute Inc. of Cary, N.C., USA may be used for a logistic regression model type; a KCLUS procedure included in SAS® Visual Data Mining and Machine Learning 8.1: Statistical Procedures developed and provided by SAS Institute Inc. of Cary, N.C., USA may be used for a k-means clustering model type; etc.

In an operation 266, an importance value associated with each variable of the plurality of variables included in input dataset 124 is determined. For example, an HP4SCORE procedure included in SAS® Enterprise Miner 14.3 developed and provided by SAS Institute Inc. of Cary, N.C., USA may be used to score a data set or estimate the importance of variables by using a forest predictive model that was previously trained by the HPFOREST procedure included in SAS® Enterprise Miner 14.3 developed and provided by SAS Institute Inc. of Cary, N.C., USA. As another example, the FOREST procedure or the GRADBOOST procedure included in SAS® Visual Data Mining and Machine Learning 8.1: Data Mining and Machine Learning Procedures developed and provided by SAS Institute Inc. of Cary, N.C., USA may be used to score a data set or estimate the importance of variables. Other models and scoring procedures may be used. For example, for generalized linear models, a standardized parameter coefficient such as t-statistics may be used as a variable importance measure. For other models, that do not provide an inherent variable importance measure, permutation may be used.

Figure 14:
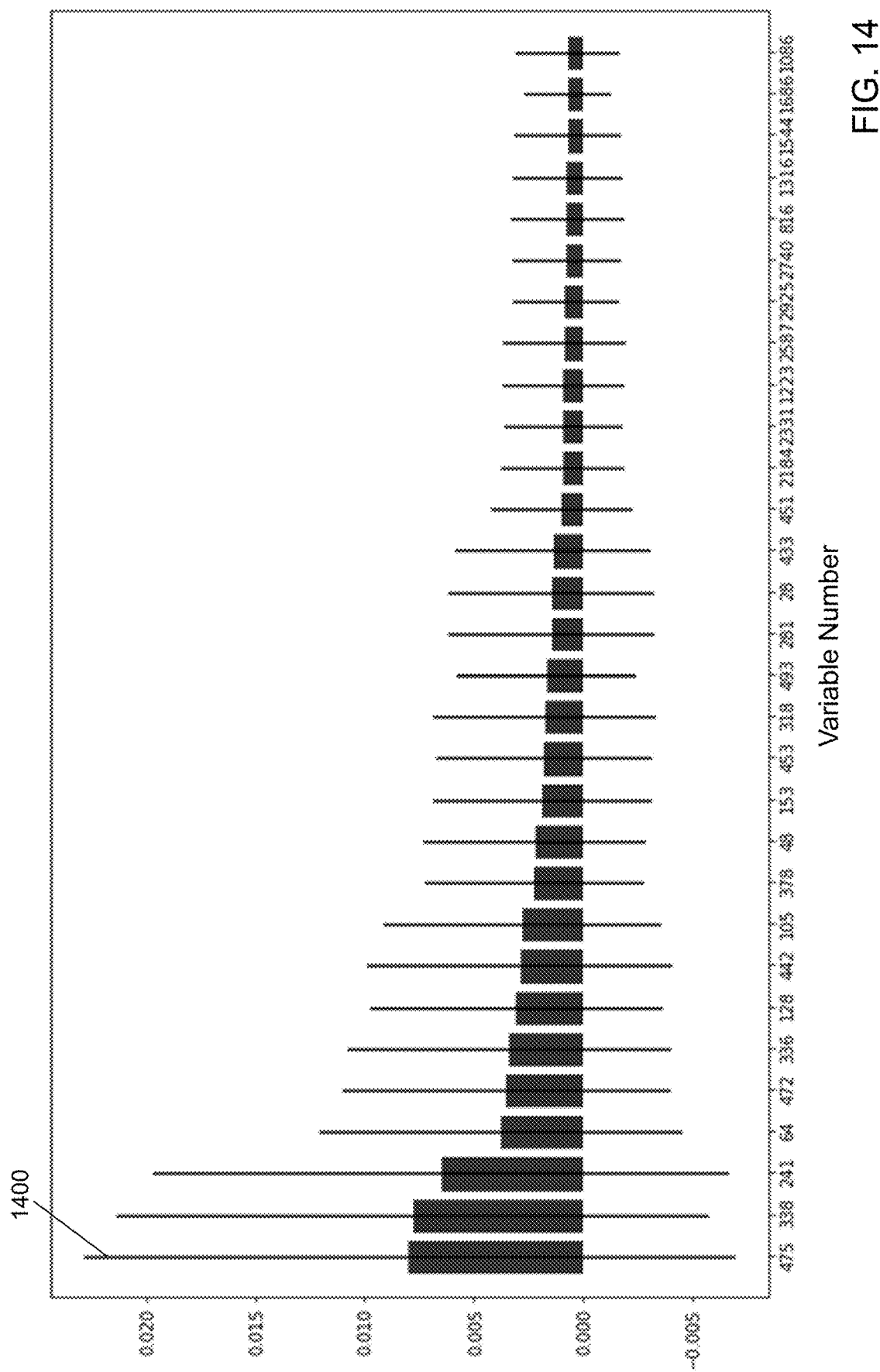
FIG. 14 shows a variable importance computed for variables of a transformed dataset in accordance with an illustrative embodiment.

For illustration, referring to FIG. 14, importance values are shown for 30 variables of 500 variables included in the publicly available MADELON dataset. The importance values are shown that have the highest importance value. The MADELON dataset further includes a $y_i$-variable (target) value. As a result, the MADELON dataset includes 501 columns of data. Each column includes 2600 observation vector values with no missing values. Each column except the target variable column was an interval variable type. A first importance bar 1400 shows a range of importance values for a variable stored in column number 475 with the solid bar indicating a standard deviation relative to a mean importance value. With the number of transformations to create selected to be five, transformed dataset 126 included 5*500+501=3001 columns and 2600 rows.

In an operation 268, a plurality of relevant variables is selected from the plurality of variables included in input dataset 124. For example, the plurality of relevant variables may be selected as a predefined number of variables that have highest values for the importance value. As another option, the plurality of relevant variables may be selected to include any variable of the plurality of variables for which the importance value is greater than or equal to a predefined threshold value.

Similar to operation 264, in an operation 270, a model is trained using each observation vector read from input dataset 124 based on the model type indicated in operation 260, the hyperparameters indicated in operation 262, and the relevant variables selected in operation 270.

In an operation 272, the data that describes the trained model is stored in trained model description data 128. The selected relevant variables may be stored separately or as part of the data that describes the trained model. For illustration, the trained model may be stored using the ASTORE procedure provided by SAS® Visual Data Mining and Machine Learning software.

Figure 3:
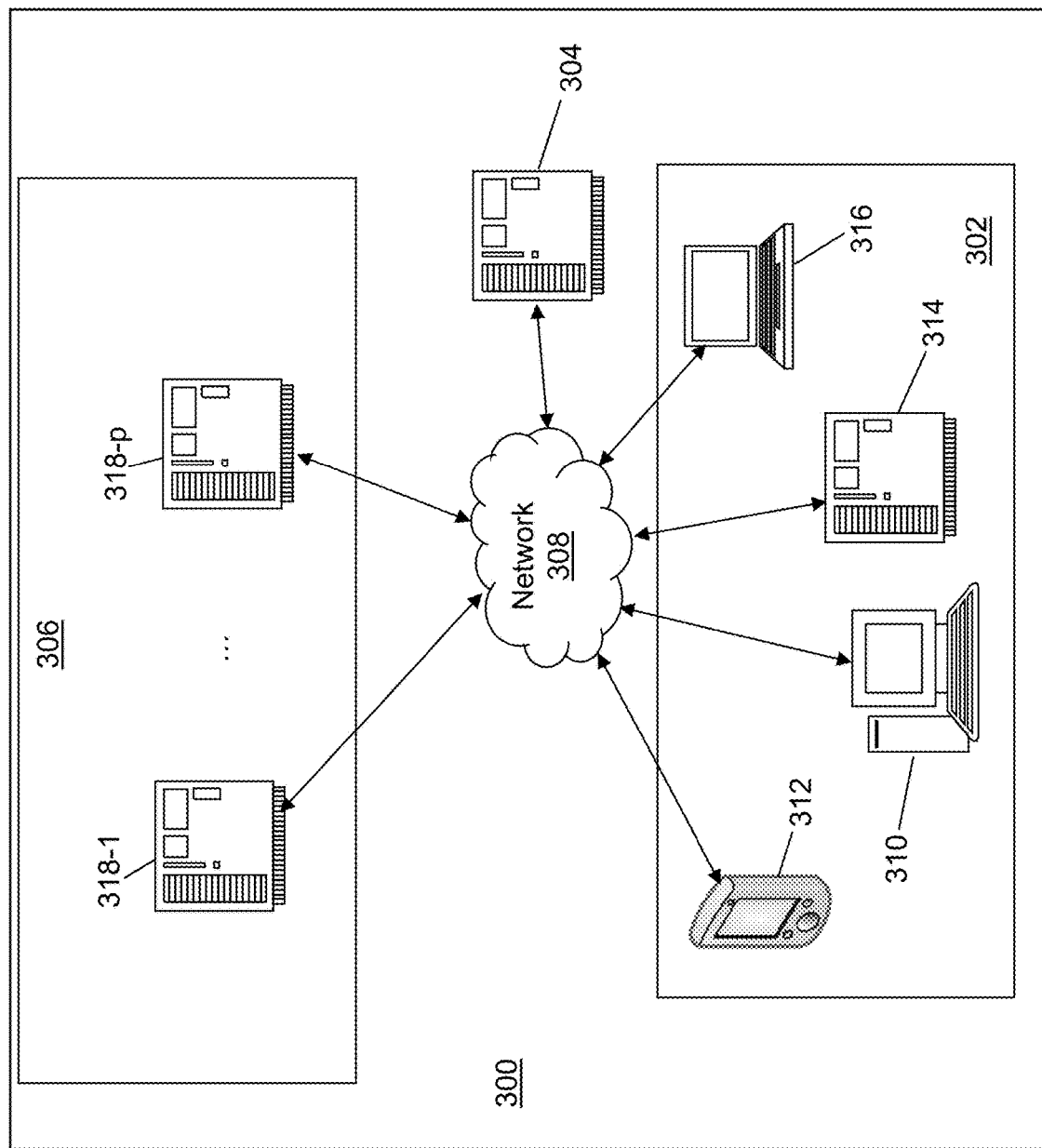
FIG. 3 depicts a block diagram of a model training system in accordance with an illustrative embodiment.

Referring to FIG. 3, a block diagram of a model training system 300 is shown in accordance with an illustrative embodiment. In an illustrative embodiment, model training system 300 may include a user system 302, a controller device 304, a worker system 306, and a network 308. Each of user system 302, controller device 304, and worker system 306 may be composed of zero or more discrete computing devices in communication through network 308. User system 302 and controller device 304 may be integrated into a single computing device capable of executing multiple threads with no worker devices of worker system 306. Model training system 300 is an example implementation using distributed computing system 130.

Network 308 may include one or more networks of the same or different types. Network 308 can be any type of wired and/or wireless public or private network including a cellular network, a local area network, a wide area network such as the Internet or the World Wide Web, etc. Network 308 further may comprise sub-networks and consist of any number of communication devices.

The one or more computing devices of user system 302 may include computing devices of any form factor such as a desktop 310, a smart phone 312, a server computer 314, a laptop 316, a personal digital assistant, an integrated messaging device, a tablet computer, etc. User system 302 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 302 may send and receive signals through network 308 to/from another of the one or more computing devices of user system 302 and/or to/from controller device 304. The one or more computing devices of user system 302 may communicate using various transmission media that may be wired and/or wireless as understood by those skilled in the art. The one or more computing devices of user system 302 may be geographically dispersed from each other and/or co-located.

Figure 4:
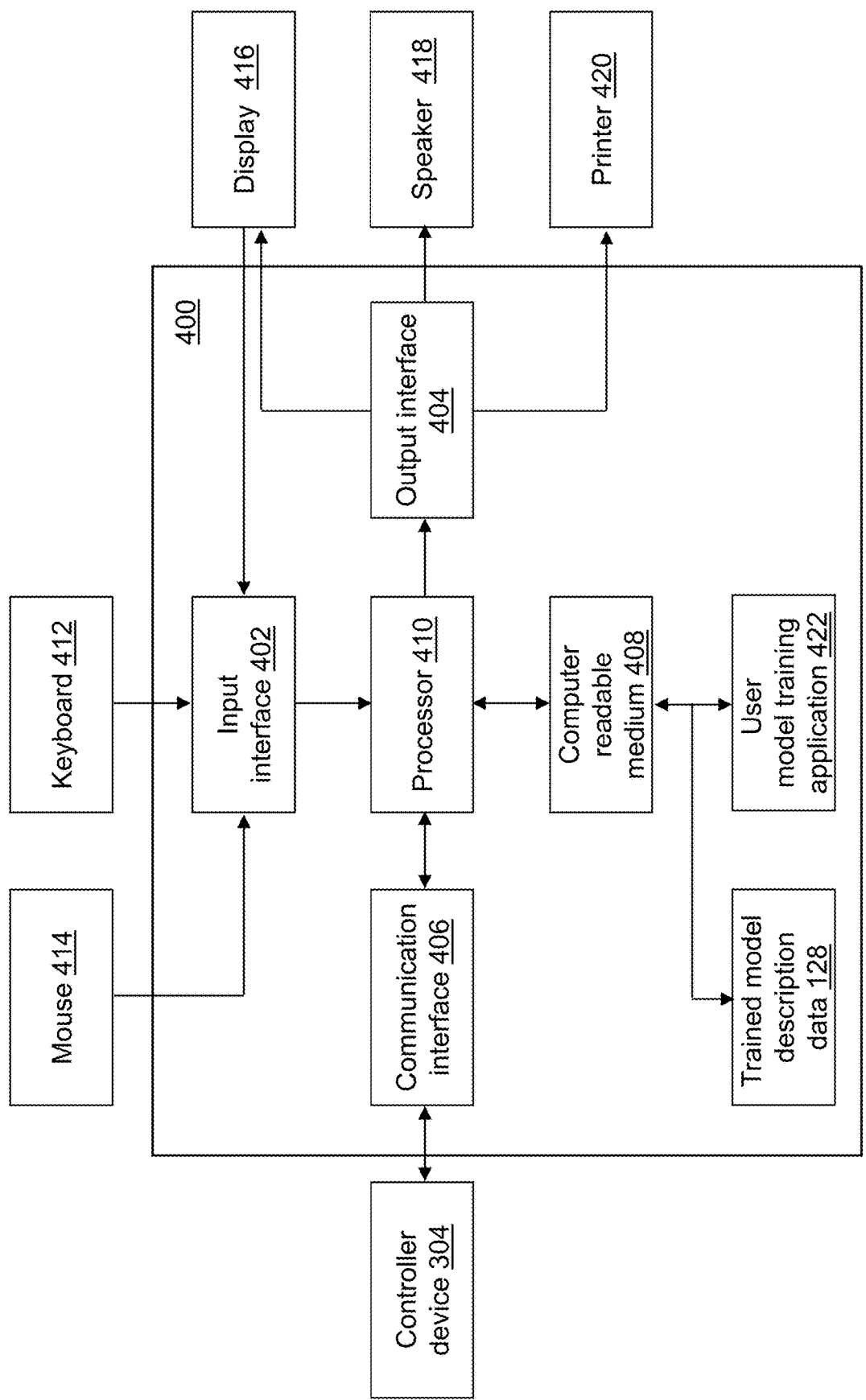
FIG. 4 depicts a block diagram of a user device of the model training system of FIG. 3 in accordance with an illustrative embodiment.

For illustration, referring to FIG. 4, a block diagram of a user device 400 is shown in accordance with an example embodiment. User device 400 is an example computing device of user system 302. For example, each of desktop 310, smart phone 312, server computer 314, and laptop 316 may be an instance of user device 400. User device 400 may include a second input interface 402, a second output interface 404, a second communication interface 406, a second computer-readable medium 408, a second processor 410, a user model training application 422, and trained model description data 128. Each computing device of user system 302 may be executing user model training application 422 of the same or different type.

Referring again to FIG. 3, controller device 304 can include any form factor of computing device. For illustration, FIG. 3 represents controller device 304 as a server computer. Controller device 304 may send and receive signals through network 308 to/from user system 302 and/or to/from worker system 306. Controller device 304 may communicate using various transmission media that may be wired and/or wireless as understood by those skilled in the art. Controller device 304 may be implemented on a plurality of computing devices of the same or different type. Model training system 300 further may include a plurality of controller devices.

Figure 5:
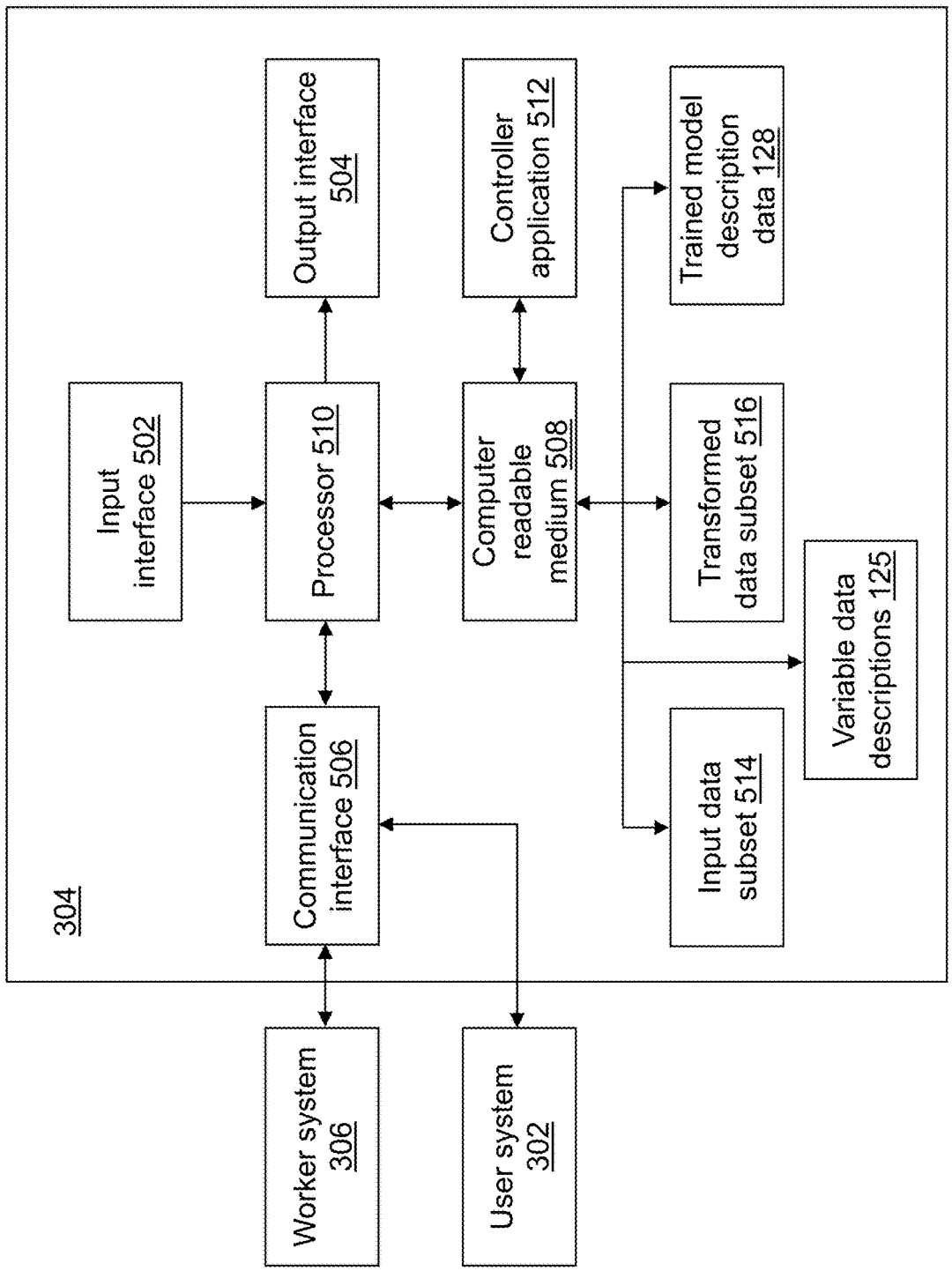
FIG. 5 depicts a block diagram of a controller device of the model training system of FIG. 3 in accordance with an illustrative embodiment.

For illustration, referring to FIG. 5, a block diagram of controller device 304 is shown in accordance with an illustrative embodiment. Controller device 304 may include a third input interface 502, a third output interface 504, a third communication interface 506, a third computer-readable medium 508, a third processor 510, a controller application 512, an input data subset 514, variable data descriptions 125, transformed data subset 516, and trained model description data 128. Controller device 304 may execute controller application 512 that controls creation of transformed data subset 516 and/or transformed data subset 616 (shown referring to FIG. 6) using variable data descriptions 125, and/or of trained model description data 128.

Referring again to FIG. 3, the one or more computing devices of worker system 306 may include computers of any form factor such as a desktop, a server, a laptop, etc. For example, in the illustrative embodiment, worker system 306 includes a first server computer 318-1, . . . , and a $p^{th}$ server computer 318-$p$. Each server computer may support use of a plurality of threads. The computing devices of worker system 306 may send and receive signals through network 308 to/from controller device 304 and/or to/from another computing device of worker system 306. The one or more computing devices of worker system 306 may be geographically dispersed from each other and/or co-located. The one or more computing devices of worker system 306 may communicate using various transmission media that may be wired and/or wireless as understood by those skilled in the art.

Figure 6:
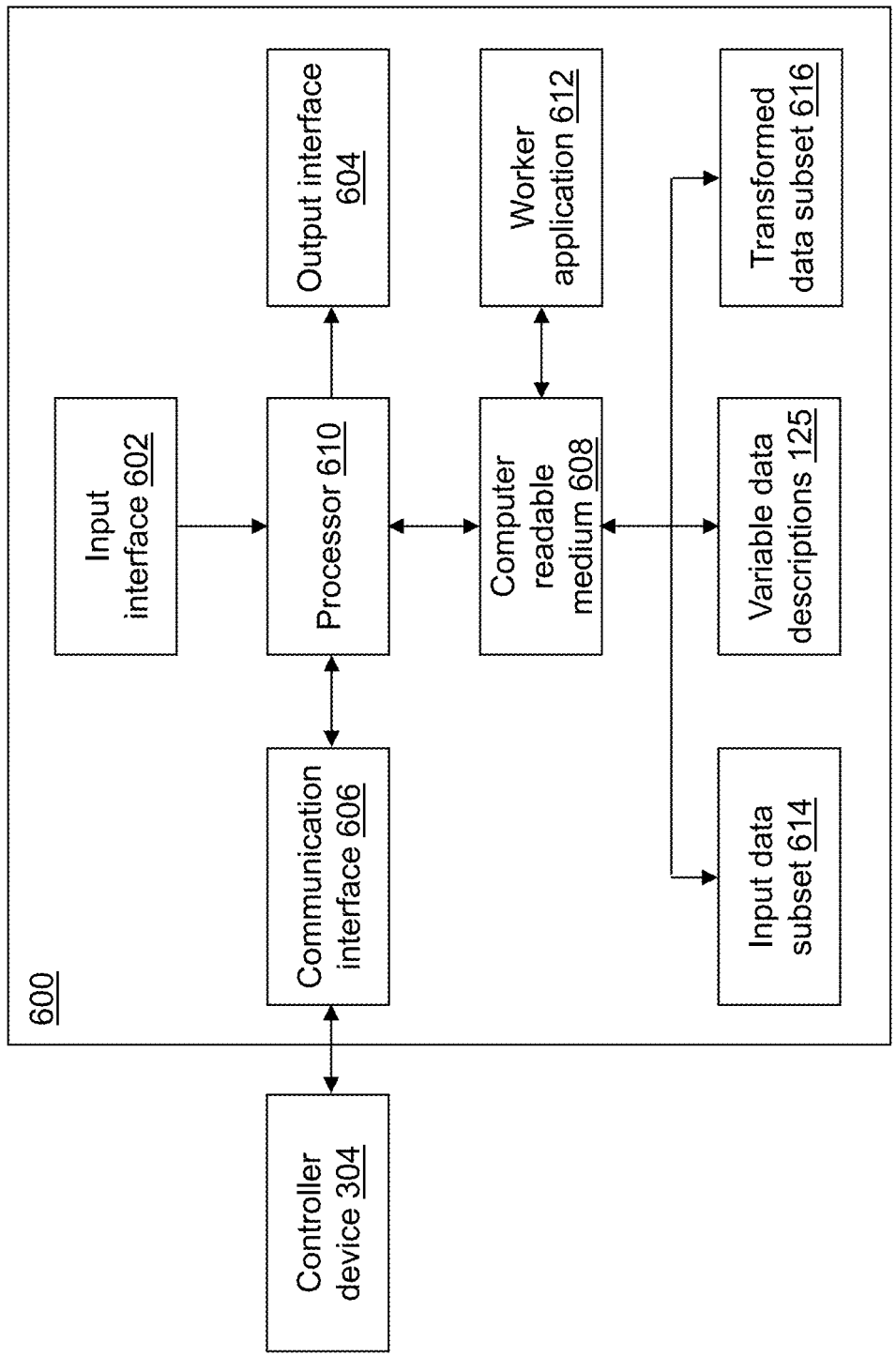
FIG. 6 depicts a block diagram of a worker-thread device of the model training system of FIG. 3 in accordance with an illustrative embodiment.

For illustration, referring to FIG. 6, a block diagram of a worker device 600 is shown in accordance with an example embodiment. Worker device 600 is an example computing device of worker system 306. For example, each of first server computer 318-1, . . . , and $p^{th}$ server computer 318-$p$ may be an instance of worker device 600. Worker device 600 may include a fourth input interface 602, a fourth output interface 604, a fourth communication interface 606, a fourth computer-readable medium 608, a fourth processor 610, a worker application 612, an input data subset 614, variable data descriptions 125, and transformed data subset 616. Input dataset 124 may be stored in input data subset 614 distributed across each worker device 600 of worker system 306. A portion of input dataset 124 may also be stored in input data subset 514 stored on controller device 304.

Referring again to FIG. 4, each user device 400 of user system 302 may include the same or different components and combinations of components. Fewer, different, and additional components may be incorporated into user device 400. Second input interface 402 provides the same or similar functionality as that described with reference to input interface 102 of model training device 100 though referring to user device 400. Second output interface 404 provides the same or similar functionality as that described with reference to output interface 104 of model training device 100 though referring to user device 400. Second communication interface 406 provides the same or similar functionality as that described with reference to communication interface 106 of model training device 100 though referring to user device 400. Data and messages may be transferred between controller device 304 and user device 400 using second communication interface 406. Second computer-readable medium 408 provides the same or similar functionality as that described with reference to computer-readable medium 108 of model training device 100 though referring to user device 400. Second processor 410 provides the same or similar functionality as that described with reference to processor 110 of model training device 100 though referring to user device 400.

User model training application 422 performs operations associated with selecting relevant variables and/or with training a machine learning model. The operations may be implemented using hardware, firmware, software, or any combination of these methods. Referring to the example embodiment of FIG. 4, user model training application 422 is implemented in software (comprised of computer-readable and/or computer-executable instructions) stored in second computer-readable medium 408 and accessible by second processor 410 for execution of the instructions that embody the operations of user model training application 422. User model training application 422 may be written using one or more programming languages, assembly languages, scripting languages, etc.

User model training application 422 may be implemented as a Web application. User model training application 422 may be integrated with other analytic tools. As an example, user model training application 422 may be part of an integrated data analytics software application and/or software architecture such as that offered by SAS Institute Inc. of Cary, N.C., USA. For example, user model training application 422 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, user model training application 422 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA. Data mining is applicable in a wide variety of industries.

Referring to FIG. 5, fewer, different, or additional components may be incorporated into controller device 304. Third input interface 502 provides the same or similar functionality as that described with reference to input interface 102 of model training device 100 though referring to controller device 304. Third output interface 504 provides the same or similar functionality as that described with reference to output interface 104 of model training device 100 though referring to controller device 304. Third communication interface 506 provides the same or similar functionality as that described with reference to communication interface 106 of model training device 100 though referring to controller device 304. Data and messages may be transferred between controller device 304 and user device 400 and/or worker device 600 using third communication interface 506. Third computer-readable medium 508 provides the same or similar functionality as that described with reference to computer-readable medium 108 of model training device 100 though referring to controller device 304. Third processor 510 provides the same or similar functionality as that described with reference to processor 110 of model training device 100 though referring to controller device 304.

Controller application 512 performs operations associated with selecting relevant variables and/or with training a machine learning model based on inputs provided from user device 400 optionally using the computing devices of worker system 306. The operations may be implemented using hardware, firmware, software, or any combination of these methods. Referring to the example embodiment of FIG. 5, controller application 512 is implemented in software (comprised of computer-readable and/or computer-executable instructions) stored in third computer-readable medium 508 and accessible by third processor 510 for execution of the instructions that embody the operations of controller application 512. Controller application 512 may be written using one or more programming languages, assembly languages, scripting languages, etc. Controller application 512 may be implemented as a Web application.

Controller application 512 may be integrated with other analytic tools. As an example, controller application 512 may be part of an integrated data analytics software application and/or software architecture such as that offered by SAS Institute Inc. of Cary, N.C., USA. For example, controller application 512 may be part of SAS® Enterprise Miner™ developed and provided by SAS Institute Inc. of Cary, N.C., USA. Merely for further illustration, controller application 512 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA.

Referring to FIG. 6, fewer, different, and additional components may be incorporated into worker device 600. Each worker device 600 of worker system 306 may include the same or different components or combination of components. Fourth input interface 602 provides the same or similar functionality as that described with reference to input interface 102 of model training device 100 though referring to worker device 600. Fourth output interface 604 provides the same or similar functionality as that described with reference to output interface 104 of model training device 100 though referring to worker device 600. Fourth communication interface 606 provides the same or similar functionality as that described with reference to communication interface 106 of model training device 100 though referring to worker device 600. Data and messages may be transferred between controller device 304 and worker device 600 using fourth communication interface 606. Fourth computer-readable medium 608 provides the same or similar functionality as that described with reference to computer-readable medium 108 of model training device 100 though referring to worker device 600. Fourth processor 610 provides the same or similar functionality as that described with reference to processor 110 of model training device 100 though referring to worker device 600.

Worker application 612 may be integrated with other analytic tools. As an example, worker application 612 may be part of an integrated data analytics software application and/or software architecture such as that offered by SAS Institute Inc. of Cary, N.C., USA. For example, worker application 612 may be part of SAS® Enterprise Miner™ developed and provided by SAS Institute Inc. of Cary, N.C., USA. Merely for further illustration, worker application 612 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA.

User model training application 422, controller application 512, and worker application 612 may be the same or different applications that are integrated in various manners to select relevant variables and/or to train a machine learning model using input dataset 124 distributed across controller device 304 and/or worker system 306 into input data subset 514 and/or input data subset 614, respectively.

Figure 7:
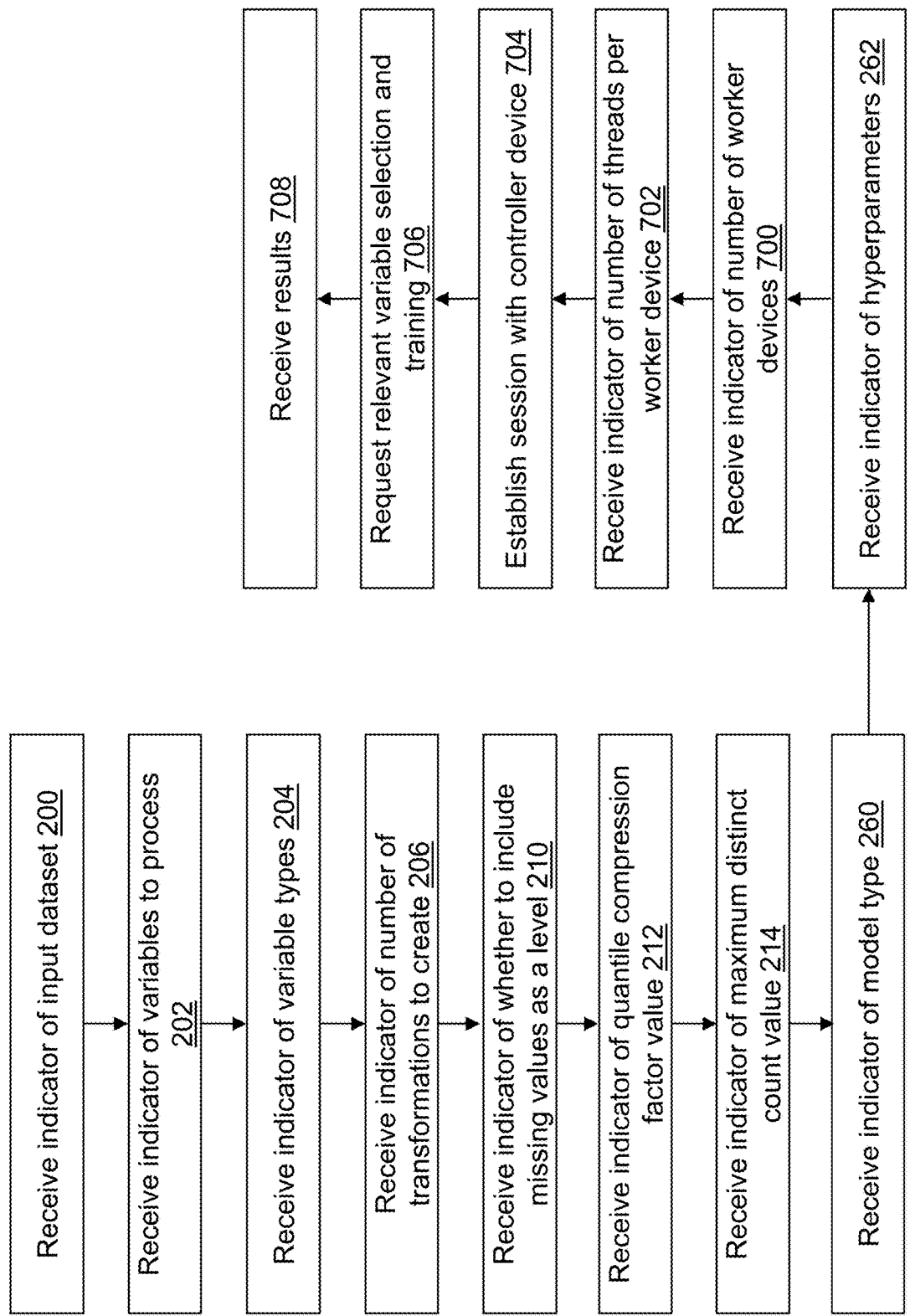
FIG. 7 depicts a flow diagram illustrating examples of operations performed by the user device of FIG. 4 in accordance with an illustrative embodiment.

Referring to FIG. 7, example operations associated with user model training application 422 are described. Additional, fewer, or different operations may be performed depending on the embodiment. The order of presentation of the operations of FIG. 7 is not intended to be limiting. A user can interact with one or more user interface windows presented to the user in a display under control of user model training application 422 independently or through a browser application in an order selectable by the user. Although some of the operational flows are presented in sequence, the various operations may be performed in various repetitions, concurrently, and/or in other orders than those that are illustrated. For example, a user may execute user model training application 422, which causes presentation of a first user interface window, which may include a plurality of menus and selectors such as drop down menus, buttons, text boxes, hyperlinks, etc. associated with user model training application 422 as understood by a person of skill in the art. As further understood by a person of skill in the art, various operations may be performed in parallel, for example, using a plurality of threads or a plurality of computing devices such as a grid or a cloud of computing devices.

Similar to model training application 122, user model training application 422 may perform one or more of operations 200 to 214, 260, and 262 to define parameters for execution of user model training application 422. In operation 200 performed by user device 400, the indicator of input dataset 124 may indicate input data subset 514 and/or input data subset 614.

In an operation 700, a tenth indicator may be received that indicates the number of computing devices W of worker system 306. In an alternative embodiment, the tenth indicator may not be received. For example, a default value may be stored, for example, in computer-readable medium 408 and used automatically. In another alternative embodiment, W may not be selectable. Instead, a fixed, predefined value may be used. The value further may be automatically determined based on a number of computing devices connected to controller device 304.

In an operation 702, an eleventh indicator may be received that indicates a number of threads T of each computing device of worker system 306 and/or of controller device 304. In an alternative embodiment, the eleventh indicator may not be received. For example, a default value may be stored, for example, in computer-readable medium 408 and used automatically. In another alternative embodiment, T may not be selectable. Instead, a fixed, predefined value may be used. The value further may be automatically determined based on a number of CPUs available in each computing device of worker system 306 and/or in controller device 304.

When W=0, controller device 304 may operate in single-machine mode meaning multithreaded operation using the number of threads T concurrently to take advantage of parallel execution on multiple processing units. When W=0, input dataset 124 is distributed into a plurality of input data subsets with each thread of the plurality of threads allocated a single input data subset 514. When W>0, controller device 304 may be, for example, a grid host. When W=0, T=1, and user device 400 and controller device 304 are integrated, the operations of FIGS. 2A, 2B, and 2C or optionally of FIGS. 2A, 2D, and 2C are performed and the integrated user device 400 and controller device 304 are referred to as model training device 100.

In an operation 704, a session is established with controller device 304 when user device 400 and controller device 304 are not integrated. The session may further be established with controller device 304 and each worker device 600 when W>0. User device 400 accepts commands from a user and relays instructions to controller device 304 when user device 400 and controller device 304 are not integrated. When W>0, controller device 304 establishes a communication network with the worker devices of worker system 306, sending instructions to the worker devices of worker system 306, collecting and aggregating the results of computations from the worker devices of worker system 306, and communicating final results to user device 400.

In an operation 706, relevant variable selection and/or training of the model is requested. When controller device 304 and user device 400 are integrated in the same computing device, training is initiated as described further referring to FIGS. 8A and 8B. The request may include zero or more of the values defined for the parameters indicated in operations 200 to 214, 260, and 262 or zero or more of the values may be stored in a memory location known to controller device 304 when controller device 304 and user device 400 are not integrated in the same computing device.

In an operation 708, some or all of the information output in operation 274 may be received from controller device 304 when controller device 304 and user device 400 are not integrated in the same computing device. As another example, an indicator may be received that indicates that the training process is complete. For example, one or more output tables may be presented on second display 416 when the training process is complete. For example, a list of the selected relevant variables and/or a summary of the training results may be presented on second display 416 when the training process is complete. As another option, second display 416 may present a statement indicating that the training process is complete. The user can access the output tables in a predefined location.

Figure 8A:
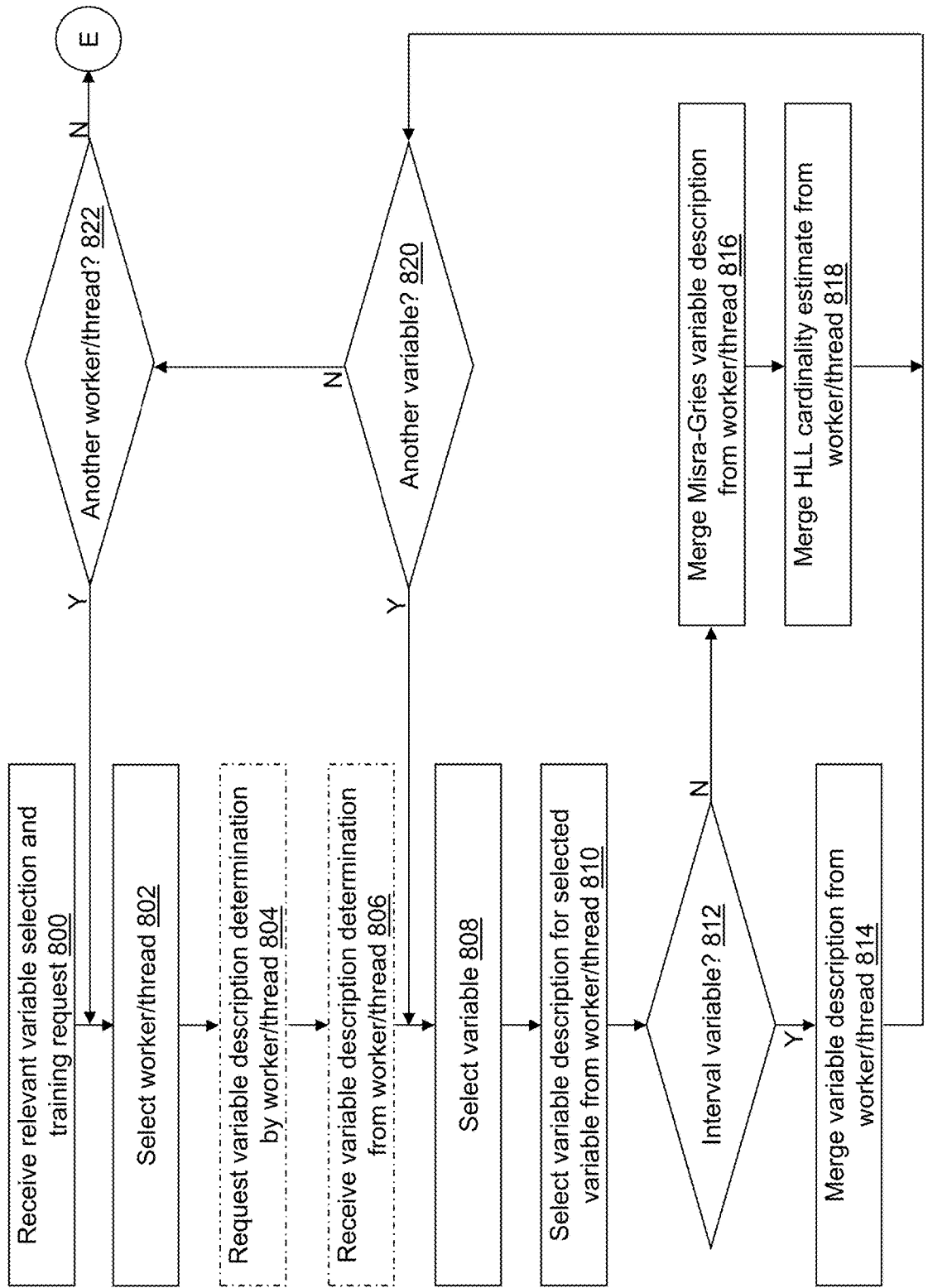
FIGS. 8A and 8B depicts a flow diagram illustrating examples of operations performed by the controller device of FIG. 5 in accordance with an illustrative embodiment.
Figure 8B:
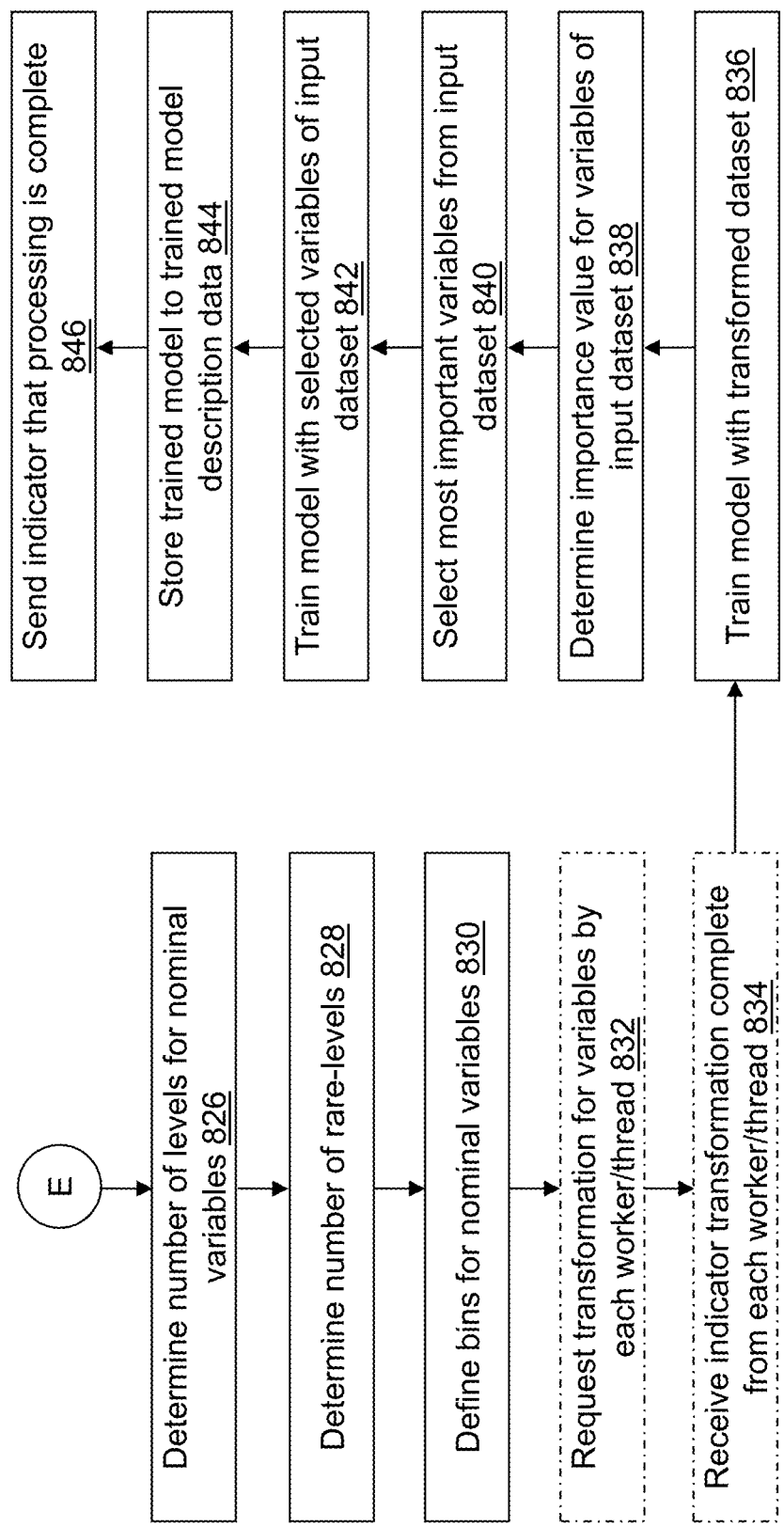

Referring to FIGS. 8A and 8B, example operations associated with controller application 512 are described. Additional, fewer, or different operations may be performed depending on the embodiment. The order of presentation of the operations of FIGS. 8A and 8B is not intended to be limiting. Again, controller application 512 and user model training application 422 may be integrated or be the same applications so that the operations of FIG. 7 and FIGS. 8A and 8B are merged.

In an operation 800, the relevant variable selection and training request may be received from user device 400 or directly from the user of user device 400 when controller device 304 and user device 400 are integrated in the same computing device. Values for the parameters indicated in operations 200 to 214, 260, and/or 262 may be received from user device 400 with the request or may be received directly from the user of user device 400 when integrated or may be read from a known memory storage location such as in a known data table or file. When controller device 304 is included as a worker device, W is incremented using W=W+1 to indicate that the values computed by each thread of controller device 304 on each input data subset 514 are included in the determinations below.

In an operation 802, a worker/thread is selected. For example, on each iteration of operation 802, a next worker/thread is selected until each has been processed based on the values of W and T. The selected worker/thread may be indicated by w that indicates an index to the respective worker device 400 and t that indicates an index to the respective thread of the respective worker device 400.

In an operation 804, a request is sent to the selected worker/thread. The request indicates that the selected worker/thread compute $DD_{j,w,t}$, $j=1, 2, \ldots, d$ for input data subset 514 allocated to the selected thread t of controller device 304 and/or input data subset 614 distributed to w the selected worker device 400 and allocated to the selected thread t of the selected worker device 400. The request is sent by a controller thread of controller device 304. The request may include zero or more of the values defined for the parameters indicated in operations 200 to 214, 260, and 262 or zero or more of the values may be stored in a memory location known to the selected worker device 400.

In an operation 806, the $DD_{j,w,t}$, $j=1, 2, \ldots, d$ are received from the selected thread t of w the selected worker device 400 of worker system 306 and/or from the selected thread t of w that indicates controller device 304. The values are received by the controller thread of controller device 304.

Similar to operation 226, in an operation 808, a variable of the plurality of variables indicated in operation 202 is selected, for example, to define a value of index j.

In an operation 810, the variable data description $DD_{j,w,t}$ is selected for the selected variable and the selected worker/thread.

Similar to operation 234, in an operation 812, a determination is made concerning whether the selected variable is an interval variable. When the selected variable is an interval variable, processing continues in an operation 814. When the selected variable is not an interval variable, processing continues in an operation 816.

In operation 814, the selected variable data description $DD_{j,w,t}$ is merged with a controller variable data description $DD_j$, and processing continues in operation 820. For example, a quantile merge as described in in Algorithm 2 on page 12 of Ted Dunning and Otmar Ertl, *Computing Extremely Accurate Quantiles Using t-Digests*, (2091) published online at https://arxiv.org/pdf/1902.04023.pdf is performed to merge $DD_{j,w,t}$ into $DD_j$.

In operation 816, the selected variable data description $DD_{j,w,t}$ computed using the Misra-Gries algorithm is merged with a controller variable data description $DD_j$. For example, a Misra-Gries merge as described in the section titled "Merging algorithm that favors small summary size" of Agarwal, Pankaj K. et al., *Mergeable Summaries*, ACM Transactions on Database Systems, Vol. 38 (2012) is performed to merge $DD_{j,w,t}$ into $DD_j$.

In an operation 818, the cardinality estimate for the selected variable data description computed using the HLL algorithm is merged with a controller cardinality estimate of $DD_j$, and processing continues in operation 820. For example, a cardinality estimate merge is performed by performing a MAX operation over the contents of the registers. A register in the context of the HLL algorithm is a small buffer that can contain 'p' number of 32 bit integers (e.g. p can range from {10, 64}-practically p<=32). Given two registers R1 and R2, the merged register, R12 is obtained by:

For I in range{1, p}:
R12[i]=MAX(R1[I], R2[I])

Similar to operation 258, in operation 820, a determination is made concerning whether another variable is to be processed. For example, each variable of the plurality of variables indicated in operation 202 is processed. A fourth counter can be used and compared to the number of the plurality of variables d to determine when another variable is to be processed. When another variable is processed, processing continues in operation 808. When another variable value is not processed, processing continues in an operation 822. As a result, the number of the plurality of variables d defines a number of times that operation 820 is repeated for each worker/thread.

In operation 822, a determination is made concerning whether another worker/thread is to be selected. For example, each worker and each thread is processed. One or more counters can be used and compared to the values of W and/or T to determine when another worker/thread is to be selected. When another worker/thread is to be selected, processing continues in operation 802. When another worker/thread is not to be selected, processing continues in an operation 826 shown referring to FIG. 8B. As a result, the values of W and/or T define a number of times that operation 822 is repeated.

Referring to FIG. 8B, similar to operation 218, in an operation 826, a number of levels for each variable having the nominal variable type is determined from the merged $DD_j$ computed using the Misra-Gries algorithm.

Similar to operation 220, in an operation 828, a number of rare-levels is determined for each variable having the nominal variable type as a difference between the merged cardinality estimate and the number of levels determined in operation 218.

Similar to operation 222, in an operation 830, a plurality of bins is defined for each variable using the merged $DD_j$.

In an operation 832, a request is sent to each thread of each worker device 400 of worker system 306 and/or to each thread of controller device 304. The request indicates that each worker/thread create transformed data subset 516 and/or transformed data subset 616 for input data subset 514 allocated to each thread of controller device 304 and/or input data subset 614 distributed to each worker device 400 and allocated to each thread of worker device 400, respectively. In an illustrative embodiment, the request may be broadcast to each worker device 400. The request is sent by the controller thread of controller device 304. The request may include the plurality of bins defined for each variable or the plurality of bins defined for each variable may be stored in a known memory location accessible by each worker device 400.

In an operation 834, an indicator that the transformation is complete is received from each worker/thread.

Similar to operation 264, in an operation 836, a model is trained using transformed data subset 516 and/or each transformed data subset 616, the model type indicated in operation 260, and the hyperparameters indicated in operation 262.

Similar to operation 266, in an operation 838, an importance value associated with each variable of the plurality of variables included in input dataset 124 is determined.

Similar to operation 268, in an operation 840, a plurality of relevant variables is selected from the plurality of variables included in input dataset 124.

Similar to operation 836, in an operation 842, a model is trained using transformed data subset 516 and/or each transformed data subset 616 based on the model type indicated in operation 260, the hyperparameters indicated in operation 262, and the relevant variables selected in operation 840.

Similar to operation 272, in an operation 844, the data that describes the trained model is stored in trained model description data 128.

In an operation 846, an indicator that processing is complete is sent to user device 400 when controller device 304 and user device 400 are not integrated in the same computing device.

Figure 9B:
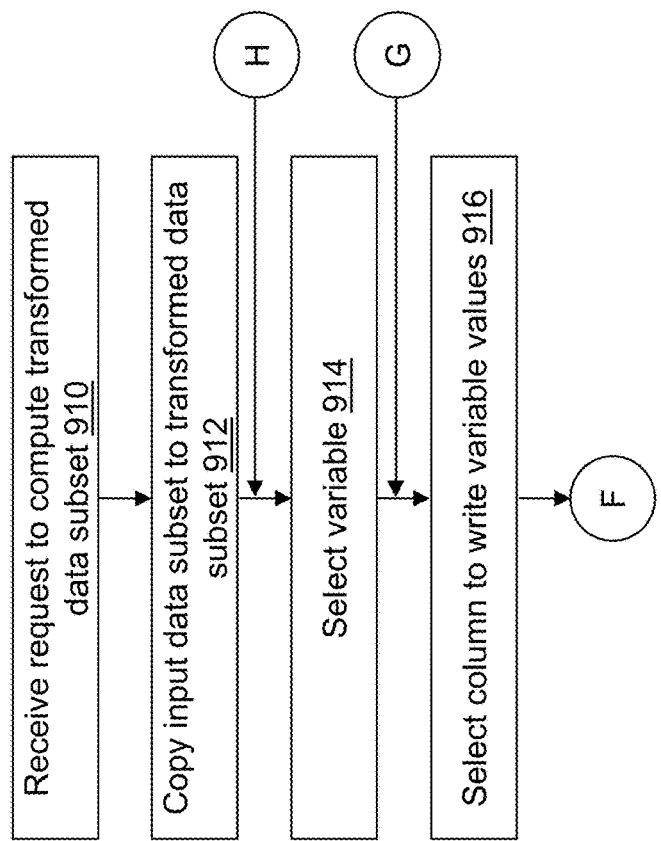
FIGS. 9A, 9B, and 9C depict flow diagrams illustrating examples of operations performed by the worker device of FIG. 6 in accordance with an illustrative embodiment.
Figure 9A:
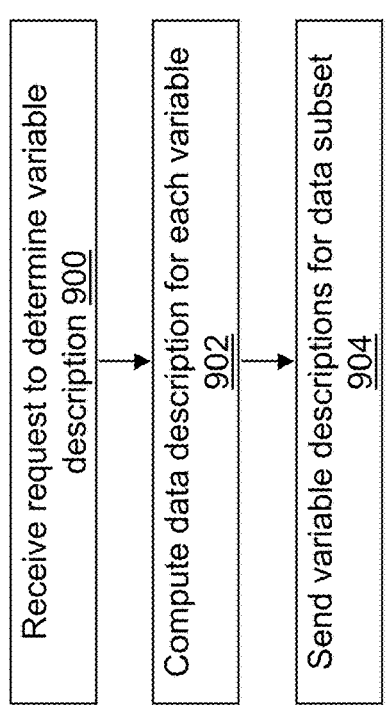
Figure 9C:
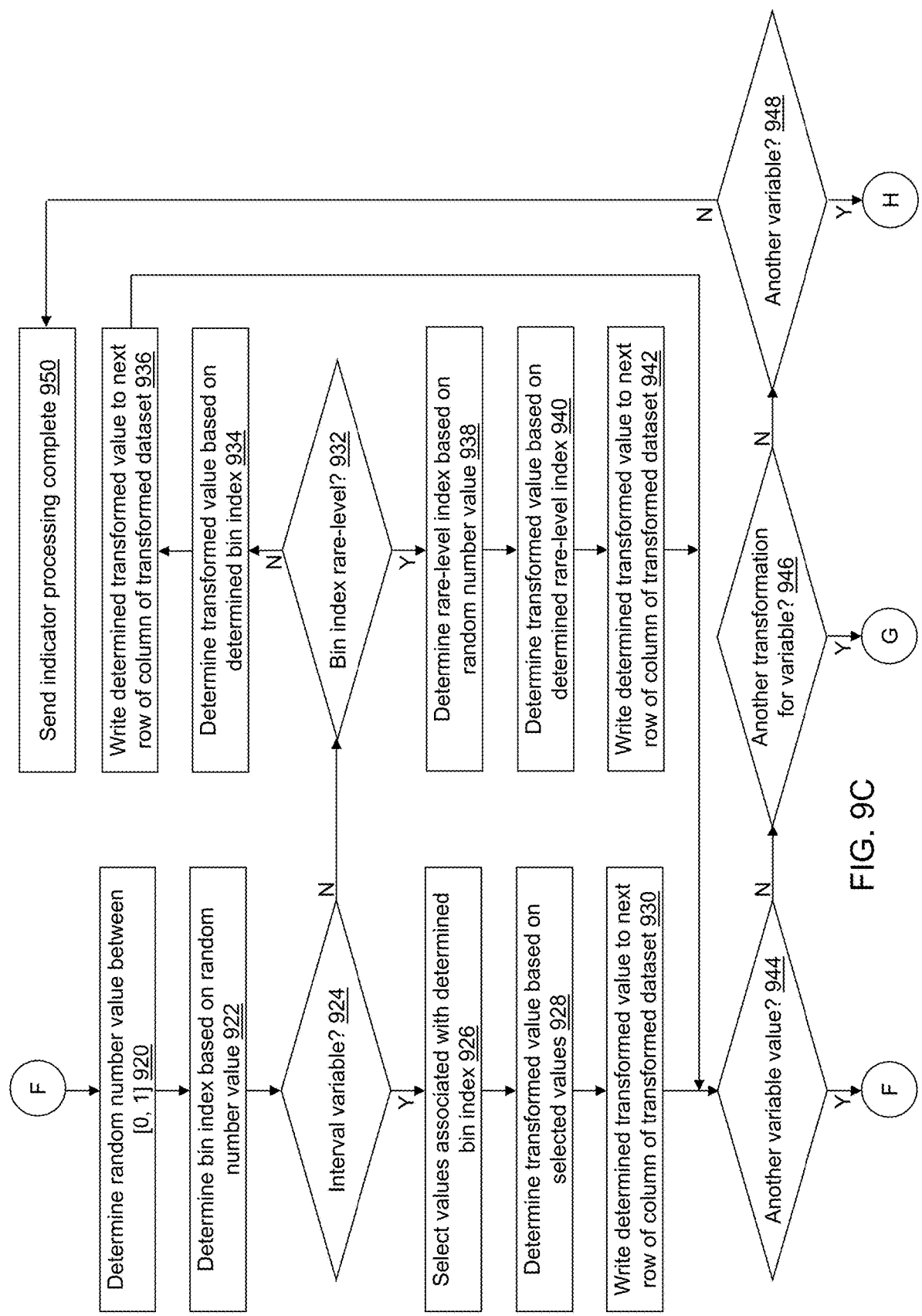

Referring to FIGS. 9A, 9B, and 9C, example operations associated with worker application 612 are described. Additional, fewer, or different operations may be performed depending on the embodiment. The order of presentation of the operations of FIGS. 9A, 9B, and 9C is not intended to be limiting. When controller device 304 is acting as a worker device, each thread of the number of threads T of controller device 304 also executes the operations of FIGS. 9A, 9B, and 9C with the assigned input data subset 514.

Referring to FIG. 9A, in an operation 900, the request to determine the variable data description for input data subset 614 or input data subset 514 is received from controller device 304 as a result of operation 804.

Similar to operation 216, in an operation 902, a data description $DD_j$, j=1, 2, . . . , d may be determined for each variable of the plurality of variables from either input data subset 514 or input data subset 614.

In an operation 904, the determined data descriptions $DD_j$, j=1, 2, . . . , d are sent to controller device 304, and processing continues in operation 806 of FIG. 8A.

Referring to FIG. 9B, in an operation 910, the request to compute transformed data subset 516 or transformed data subset 516 from input data subset 614 or input data subset 514, respectively, is received from controller device 304 as a result of operation 832. The request may include the plurality of bins defined for each variable.

Similar to operation 224, in an operation 912, the columns of data of input dataset 124 that are associated with the plurality of variables to process indicated in operation 202 are copied into transformed data subset 516 or transformed data subset 516 from input data subset 614 or input data subset 514, respectively, including the column associated with the target variable, if any.

Similar to operation 226, in an operation 914, a variable is selected from the plurality of variables.

Similar to operation 228, in an operation 916, a column is selected in transformed dataset 126 to store the transformed variable data values, and processing continues in an operation 920 shown referring to FIG. 9C.

Referring to FIG. 9C, similar to operation 230, in operation 920, a random number value is drawn from a uniform random number distribution between zero and one inclusive.

Similar to operation 232, in an operation 922, a bin index is determined using the random number value either with the plurality of bins defined from the cumulative quantile data when the variable type for the selected variable has the interval variable type or with the plurality of bins defined using the frequency data from the Misra-Gries method when the variable type for the selected variable has the nominal variable type.

Similar to operation 234, in an operation 924, a determination is made concerning whether the selected variable is an interval variable. When the selected variable is an interval variable, processing continues in an operation 926. When the selected variable is not an interval variable, processing continues in an operation 932.

Similar to operation 236, in operation 926, the mean value, the standard deviation value, the minimum bin value, and the maximum bin value associated with the bin index are selected.

Similar to operation 238, in an operation 928, a transformed value is determined based on the selected mean value, standard deviation value, minimum bin value, and maximum bin value.

Similar to operation 240, in an operation 930, the determined transformed value is stored in a next row of the selected column, and processing continues in an operation 944.

Similar to operation 242, in an operation 932, a determination is made concerning whether the determined bin index indicates the rare-level bin index. When the determined bin index indicates the rare-level bin index, processing continues in an operation 938. When the determined bin index does not indicate the rare-level bin index, processing continues in an operation 934.

Similar to operation 244, in operation 934, a transformed value is determined as the numeric value associated with the determined bin index.

Similar to operation 246, in an operation 936, the determined transformed value is stored in a next row of the selected column, and processing continues in operation 944.

Similar to operation 248, in operation 938, a rare-level index is determined.

Similar to operation 250, in an operation 940 a transformed value is determined based on a numeric value that is the determined rare-level index plus the number of levels of the selected variable.

Similar to operation 252, in an operation 942, the determined transformed value is stored in a next row of the selected column, and processing continues in operation 944.

Similar to operation 254, in operation 944, a determination is made concerning whether another variable value is to be determined and added to the selected column. When another variable value is to be determined, processing continues in operation 920. When another variable value is not to be determined, processing continues in an operation 946.

Similar to operation 256, in operation 946, a determination is made concerning whether another transformation is to be determined for the selected variable. When another transformation is to be determined, processing continues in operation 916. When another transformation is not to be determined, processing continues in an operation 948.

Similar to operation 258, in operation 948, a determination is made concerning whether another variable is to be processed. When another variable is to be processed, processing continues in operation 914. When another variable value is not to be processed, processing continues in an operation 950.

In operation 950, an indicator that transformed data subset 516 or transformed data subset 516 has been created is sent to controller device 304, and processing continues in operation 834 of FIG. 8B. Each transformed data subset 516 or transformed data subset 516 includes a number of columns $N_c$ defined by $N_c = d + N_{tx}*d$. When input dataset 124 includes a $y_i$-variable (target) value for one or more observation vectors, each transformed data subset 516 or transformed data subset 516 includes a number of columns defined by $N_c = N_c + 1$. Each transformed data subset 516 or transformed data subset 516 includes a number of columns $N_c$ with observation vector values defined for each of the plurality of observation vectors $n_{w,t}$, where $n_{w,t}$ indicates the number of the plurality of observation vectors stored in the worker device indicated by w and the thread indicated by t. The value of $n_{w,t}$ may vary for each worker/thread. The operations of FIGS. 9B and 9C describe writing to transformed data subset 516 or transformed data subset 516 by writing down each row before adding a next column. However, the looping created by operations 944, 946, and 948 can be performed in different orders. For example, similar to the operations of FIG. 2D, operation 946 can be performed before operation 948, which is performed before operation 944, resulting in all of the columns being written one row at a time.

Figure 15:
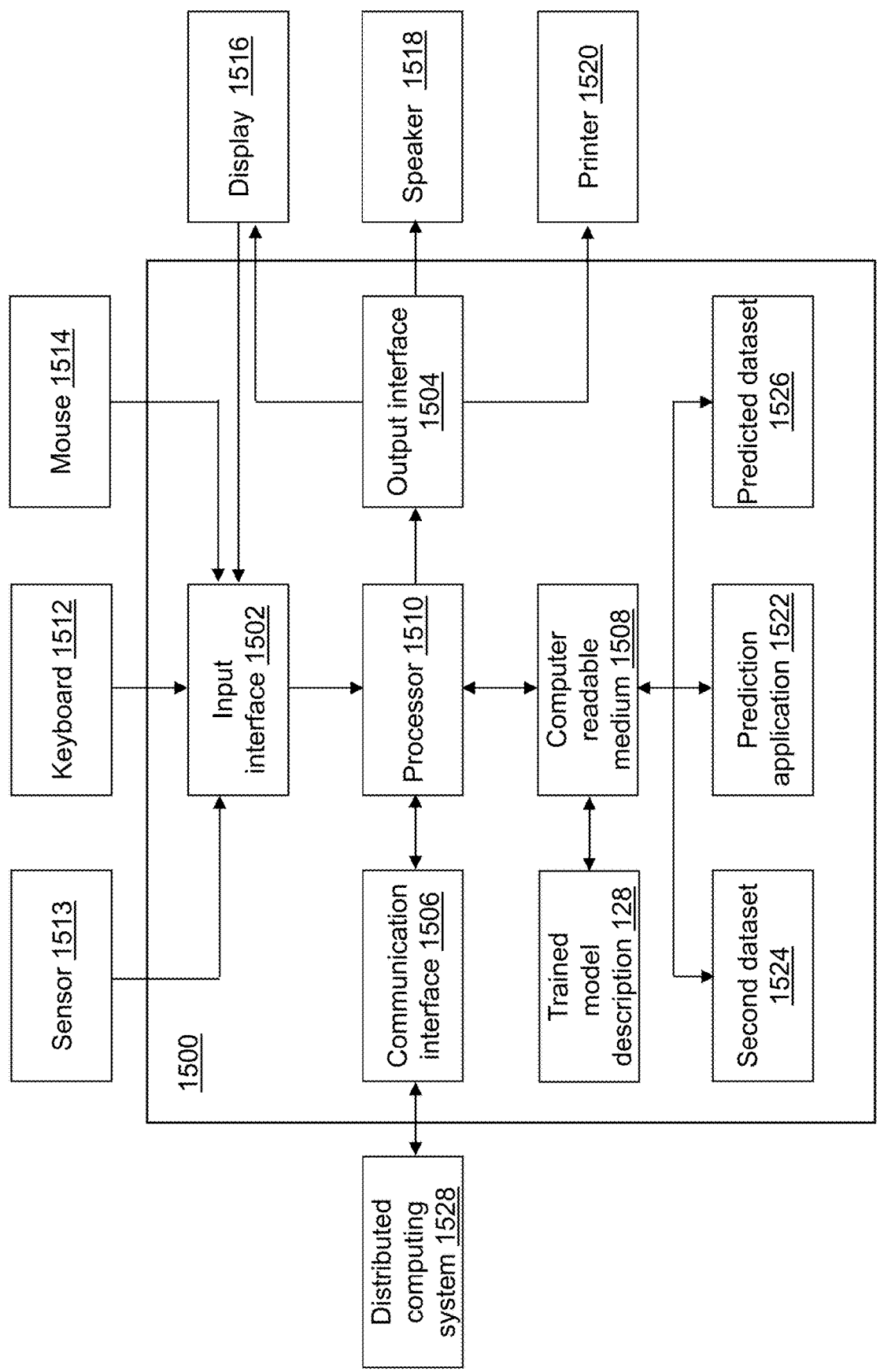
FIG. 15 depicts a block diagram of a prediction device in accordance with an illustrative embodiment.

Referring to FIG. 15, a block diagram of a prediction device 1500 is shown in accordance with an illustrative embodiment. Prediction device 1500 may include a fifth input interface 1502, a fifth output interface 1504, a fifth communication interface 1506, a fifth non-transitory computer-readable medium 1508, a fifth processor 1510, a prediction application 1522, trained model description 128, second dataset 1524, and predicted dataset 1526. Fewer, different, and/or additional components may be incorporated into prediction device 1500. Prediction device 1500 and user device 400 and/or controller device 304 and/or model training device 100 may be the same or different devices.

Fifth input interface 1502 provides the same or similar functionality as that described with reference to input interface 102 of model training device 100 though referring to prediction device 1500. Fifth output interface 1504 provides the same or similar functionality as that described with reference to output interface 104 of model training device 100 though referring to prediction device 1500. Fifth communication interface 1506 provides the same or similar functionality as that described with reference to communication interface 106 of model training device 100 though referring to prediction device 1500. Data and messages may be transferred between prediction device 1500 and a distributed computing system 1528 using fifth communication interface 1506. Fifth computer-readable medium 1508 provides the same or similar functionality as that described with reference to computer-readable medium 108 of model training device 100 though referring to prediction device 1500. Fifth processor 1510 provides the same or similar functionality as that described with reference to processor 110 of model training device 100 though referring to prediction device 1500.

Prediction application 1522 performs operations associated with classifying or predicting a target variable value for each observation vector included in second dataset 1524. The target variable value may be stored in predicted dataset 1526 to support various data analysis functions as well as provide alert/messaging related to the classified/predicted data. Dependent on the type of data stored in input dataset 124 (input data subset 514 and/or input data subset 614) and second dataset 1524, prediction application 1522 may identify anomalies as part of process control, for example, of a manufacturing process, for machine condition monitoring, for image classification, for intrusion detection, for fraud detection, etc. Some or all of the operations described herein may be embodied in prediction application 1522. The operations may be implemented using hardware, firmware, software, or any combination of these methods.

Referring to the example embodiment of FIG. 15, prediction application 1522 is implemented in software (comprised of computer-readable and/or computer-executable instructions) stored in fifth computer-readable medium 1508 and accessible by fifth processor 1510 for execution of the instructions that embody the operations of prediction application 1522. Prediction application 1522 may be written using one or more programming languages, assembly languages, scripting languages, etc. Prediction application 1522 may be integrated with other analytic tools. As an example, prediction application 1522 may be part of an integrated data analytics software application and/or software architecture such as that offered by SAS Institute Inc. of Cary, N.C., USA. For example, prediction application 1522 may be part of SAS® Enterprise Miner™ developed and provided by SAS Institute Inc. of Cary, N.C., USA. Merely for further illustration, prediction application 1522 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA. One or more operations of prediction application 1522 further may be performed by an ESPE. Prediction application 1522, model training application 122, user model training application 422, controller application 512, and/or worker application 612 may be the same or different applications that are integrated in various manners to execute a trained model using input dataset 124 that may be distributed (input data subset 514 and/or input data subset 614) and/or second dataset 1524.

Prediction application 1522 may be implemented as a Web application.

Prediction application 1522 may be integrated with other system processing tools to automatically process data generated as part of operation of an enterprise, to classify data in the processed data, and/or to provide a warning or alert associated with the data classification using fifth input interface 1502, fifth output interface 1504, and/or fifth communication interface 1506 so that appropriate action can be initiated in response. For example, a warning or an alert may be presented using a third display 1516, a third speaker 1518, a third printer 1520, etc. or sent to one or more computer-readable media, display, speaker, printer, etc. of distributed computing system 1528.

Input dataset 124 and second dataset 1524 may be generated, stored, and accessed using the same or different mechanisms. Similar to input dataset 124, second dataset 1524 may include a plurality of rows and a plurality of columns with the plurality of rows referred to as observations or records, and the columns referred to as variables that are associated with an observation. Second dataset 1524 may be transposed.

Similar to input dataset 124, second dataset 1524 may be stored on fifth computer-readable medium 1508 or on one or more computer-readable media of distributed computing system 1528 and accessed by prediction device 1500 using fifth communication interface 1506. Data stored in second dataset 1524 may be a sensor measurement or a data communication value, for example, from a sensor 1513, may be generated or captured in response to occurrence of an event or a transaction, generated by a device such as in response to an interaction by a user with the device, for example, from a third keyboard 1512 or a third mouse 1514, etc. The data stored in second dataset 1524 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 1524 may be captured at different time points periodically, intermittently, when an event occurs, etc. One or more columns may include a time value. Similar to input dataset 124, data stored in second dataset 1524 may be generated as part of the IoT, and some or all data may be pre- or post-processed by an ESPE.

Similar to input dataset 124, second dataset 1524 may be stored in various compressed formats such as a coordinate format, a compressed sparse column format, a compressed sparse row format, etc. Second dataset 1524 further may be stored using various structures as known to those skilled in the art including a file system, a relational database, a system of tables, a structured query language database, etc. on prediction device 1500 and/or on distributed computing system 1528. Prediction device 1500 may coordinate access to second dataset 1524 that is distributed across a plurality of computing devices that make up distributed computing system 1528. For example, second dataset 1524 may be stored in a cube distributed across a grid of computers as understood by a person of skill in the art. As another example, second dataset 1524 may be stored in a multi-node Hadoop® cluster. As another example, second dataset 1524 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 1524.

Figure 16:
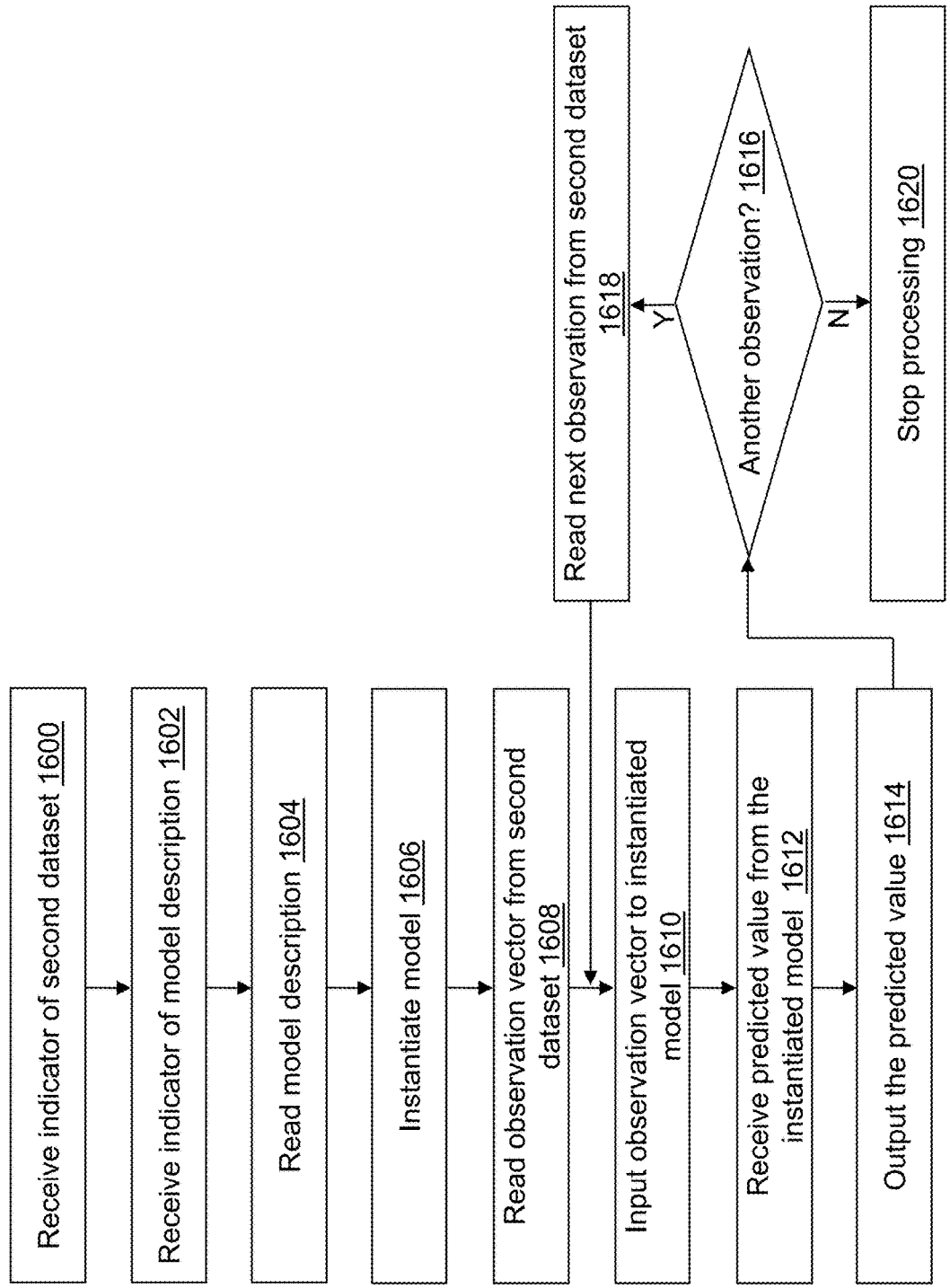
FIG. 16 depicts a flow diagram illustrating examples of operations performed by the prediction device of FIG. 15 in accordance with an illustrative embodiment.

Referring to FIG. 16, example operations of prediction application 1522 are described. Additional, fewer, or different operations may be performed depending on the embodiment of prediction application 1522. The order of presentation of the operations of FIG. 16 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1600, a twelfth indicator may be received that indicates second dataset 1524. For example, the target variable value indicator indicates a location and a name of second dataset 1524. As an example, the target variable value indicator may be received by prediction application 1522 after selection from a user interface window or after entry by a user into a user interface window. In an alternative embodiment, second dataset 1524 may not be selectable. For example, a most recently created dataset may be used automatically.

In an operation 1602, a thirteenth indicator may be received that indicates trained model description 128. For example, the thirteenth indicator indicates a location and a name of trained model description 128. As an example, the thirteenth indicator may be received by prediction application 1522 after selection from a user interface window or after entry by a user into a user interface window. In an alternative embodiment, trained model description 128 may not be selectable. For example, a most recently created model configuration data may be used automatically. As another example, trained model description 128 may be provided automatically as part of integration with model training application 122, user model training application 422, controller application 512, and/or worker application 612.

In an operation 1604, a trained model description is read from trained model description 128.

In an operation 1606, a trained model is instantiated with the trained model description. For example, the type of model, its hyperparameters, the relevant variables, and other characterizing elements are read and used to instantiate a trained model based on the information output from the training process in operation 272 or operation 846.

In an operation 1608, an observation vector is read from second dataset 1524.

In an operation 1610, the observation vector is input to the instantiated model.

In an operation 1612, a predicted target variable value for the read observation vector is received as an output of the instantiated model.

In an operation 1614, the predicted target variable value may be output, for example, by storing the predicted target variable value with the observation vector to predicted dataset 1526. In addition, or in the alternative, the predicted target variable value may be presented on third display 1516, printed on third printer 1520, sent to another computing device using fifth communication interface 1506, an alarm or other alert signal may be sounded through third speaker 1518, etc.

In an operation 1616, a determination is made concerning whether or not second dataset 1524 includes another observation vector. When second dataset 1524 includes another observation vector, processing continues in an operation 1618. When second dataset 1524 does not include another observation vector, processing continues in an operation 1620.

In operation 1618, a next observation vector is read from second dataset 1524, and processing continues in operation 1610.

In operation 1620, processing stops and cleanup is performed as needed.

Figure 18:
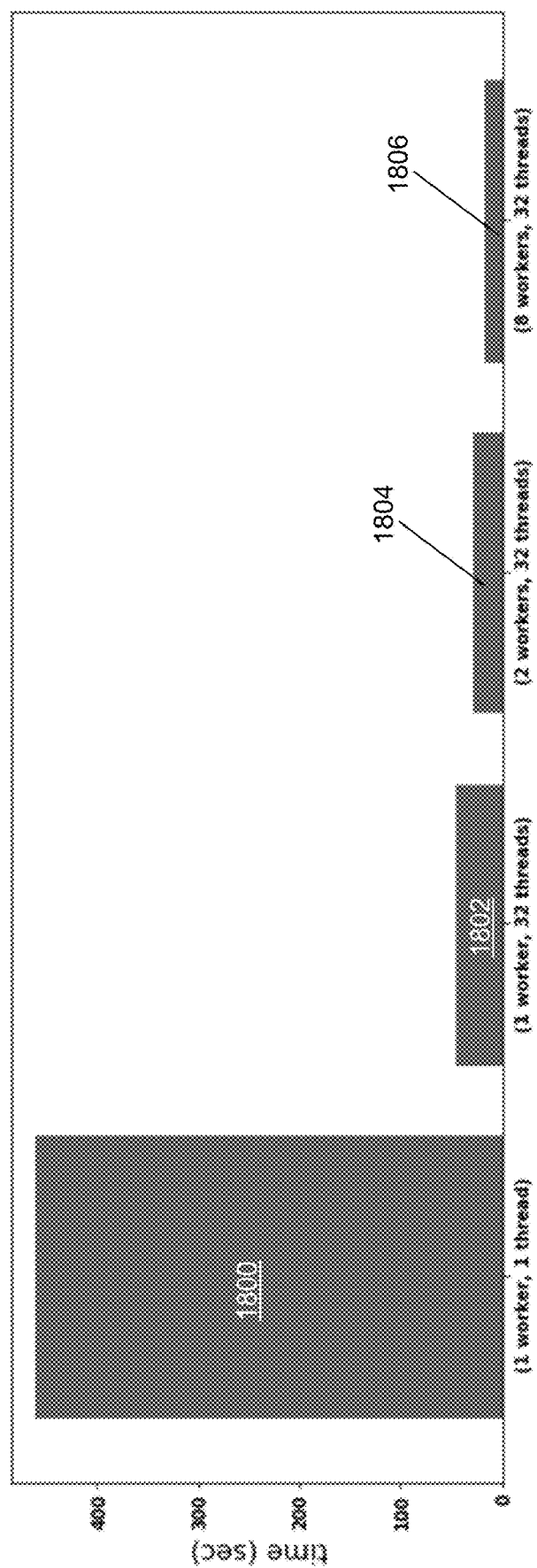
FIG. 18 shows runtime comparison results generated using model training application with model training device and with model training system with a plurality of worker computing devices and/or a plurality of threads in accordance with an illustrative embodiment.

Referring to FIG. 18, runtime results generated using model training application 122 are shown in accordance with an illustrative embodiment. A Madelon dataset with 104,000 observation vectors with 500 variables and a target variable was used. Five transformations were created resulting in 3001 columns and 104,000 rows. A first runtime 1800 of 462 seconds resulted using model training device 100 with a single thread. A second runtime 1802 of 45.5 seconds resulted using model training system 300 with a single worker computing device with 32 threads. A third runtime 1804 of 27.8 seconds resulted using model training system 300 with two worker computing devices with 32 threads each. A fourth runtime 1806 of 17.3 seconds resulted using model training system 300 with eight worker computing devices with 32 threads each. Because model training application 122 relies on a compact model of the variables, an essentially infinite stream of transformations can be generated based on user needs. Thus, model training application 122 provides for a scalable, distributed generation of random-permutation features with a low memory footprint for each worker computing device/thread.

There is no directly comparable existing method for generating transformations. Boruta an existing method includes random feature permutations (transformations). However, unlike model training application 122, Boruta and similar existing software packages rely on random permutation through indexing or sorting resulting in long runtimes or failure due to too little computer when run against a large dataset. Nevertheless, the Boruta method was compared to execution of model training application 122 with the random forest model type. Five datasets were generated and executed for comparison of the resulting runtime and accuracy in identifying the relevant variables. The five datasets only included interval variable types because the Boruta method cannot process nominal variable types natively.

A first dataset labeled "df1" was defined using:
  def synth_func_f1(X):
    X1, X2, X3, X4, X5, X6, X7, X8, X9, X10=X.transpose( )
    interaction1=np.pi**(X1*X2)*np.sqrt(2*np.abs(X3))
    interaction2=np.log(X32+X52)
    interaction3=(X9/X10)*np.sqrt(np.abs(X7/X8))
    interaction4=X2*X7

```
    main_effects=np.arcsin(X4)
    Y=interaction1+interaction2-interaction3-interac-
       tion4-main_effects
    ground_truth=[(1,2,3), (3,5), (9,10,7,8), (2,7)]
    return Y, ground_truth
A second dataset labeled "df2" was defined using:
def synth_func_f2(X):
    X1, X2, X3, X4, X5, X6, X7, X8, X9,
       X10=X.transpose( )
    interaction1=np.pi**(X1*X2)*np.sqrt(2*np.abs(X3))
    interaction2=np.log(np.abs(X3+X5)+1)
    interaction3=(X9/(1+np.abs(X10)))*np.sqrt(np.abs
       (X7)/(1+np.abs(X8)))
    interaction4=X2*X7
    main_effects=np.arcsin(0.5*X4)
    Y=interaction1+interaction2+interaction3-interac-
       tion4-main_effects
    ground_truth=[(1,2,3), (3,5), (9,10,7,8), (2,7)]
    return Y, ground_truth
A third dataset labeled "df3" was defined using:
def synth_func_f3(X):
    X1, X2, X3, X4, X5, X6, X7, X8, X9,
       X10=X.transpose( )
    interaction1=np.exp(np.abs(X1-X2))
    interaction2=np.abs(X2*X3)
    interaction3=X3**2*(np.abs(X4))
    interaction4=np.log(X4**2+X5**2+X7**2+X8**2)
    main_effects=X9+1/(1+X10**2)
    Y=interaction1+interaction2-interaction3+interac-
       tion4+main_effects
    ground_truth=[(1,2), (2,3), (3,4), (4,5,7,8)]
    return Y, ground_truth
A fourth dataset labeled "df4" was defined using:
def synth_func_f4(X):
    X1, X2, X3, X4, X5, X6, X7, X8, X9,
       X10=X.transpose( )
    interaction1=np.exp(np.abs(X1-X2))
    interaction2=np.abs(X2*X3)
    interaction3=-1*(X3**2)**np.abs(X4)
    interaction4=(X1*X4)**2
    interaction5=np.log(X4**2+X5**2+X7**2+X8**2)
    main_effects=X9+1/(1+X10**2)
    Y=interaction1+interaction2+interaction3+interac-
       tion4+interaction5+main_effects
    ground_truth=[(1,2), (2,3), (3,4), (1,4), (4,5,7,8)]
    return Y, ground_truth
A fifth dataset labeled "df5" was defined using:
def synth_func_f5(X):
    X1, X2, X3, X4, X5, X6, X7, X8, X9,
       X10=X.transpose( )
    interaction1=1/(1+X1**2+X2**2+X3**2)
    interaction2=np.sqrt(np.exp(X4+X5))
    interaction3=np.abs(X6+X7)
    interaction4=X8*X9*X10
    Y=interaction1+interaction2+interaction3+interac-
       tion4
    ground_truth=[(1,2,3), (4,5), (6,7), (8,9,10)]
    return Y, ground_truth
The creation of the first through fifth datasets was further
defined using:
    n_samples=25000
    n_features=10
    X=np.random.uniform(low=-1, high=1, size=
       (n_samples, n_features))
    y1,_=synth_func_f1(X)
    y2,_=synth_func_f2(X)
    y3,_=synth_func_f3(X)
    y4,_=synth_func_f4(X)
    y5,_=synth_func_f5(X)
    n_noise_vars=100
    X_noise=np.random.uniform(low=-1, high=1, size=
       (n_samples, n_noise_vars))
    X_all=np.hstack((X, X_noise))
    for i in range(n_features+n_noise_vars):
       df1['x'+str(i+1)]=X_all[:,i]
       df2['x'+str(i+1)]=X_all[:,i]
       df3['x'+str(i+1)]=X_all[:,i]
       df4['x'+str(i+1)]=X_all[:,i]
       df5['x'+str(i+1)]=X_all[:,i]
    mean_y1=np.mean(y1)
    mean_y2=np.mean(y2)
    mean_y3=np.mean(y3)
    mean_y4=np.mean(y4)
    mean_y5=np.mean(y5)
    df1['y']=[1 if y1[i]>mean_y1 else 0 for i in range(len
       (y1))]
    df2['y']=[1 if y2[i]>mean_y2 else 0 for i in range(len
       (y2))]
    df3['y']=[1 if y3[i]>mean_y3 else 0 for i in range(len
       (y3))]
    df4['y']=[1 if y4[i]>mean_y4 else 0 for i in range(len
       (y4))]
    df5['y']=[1 if y5[i]>mean_y5 else 0 for i in range(len
       (y5))]
```

Figure 19:
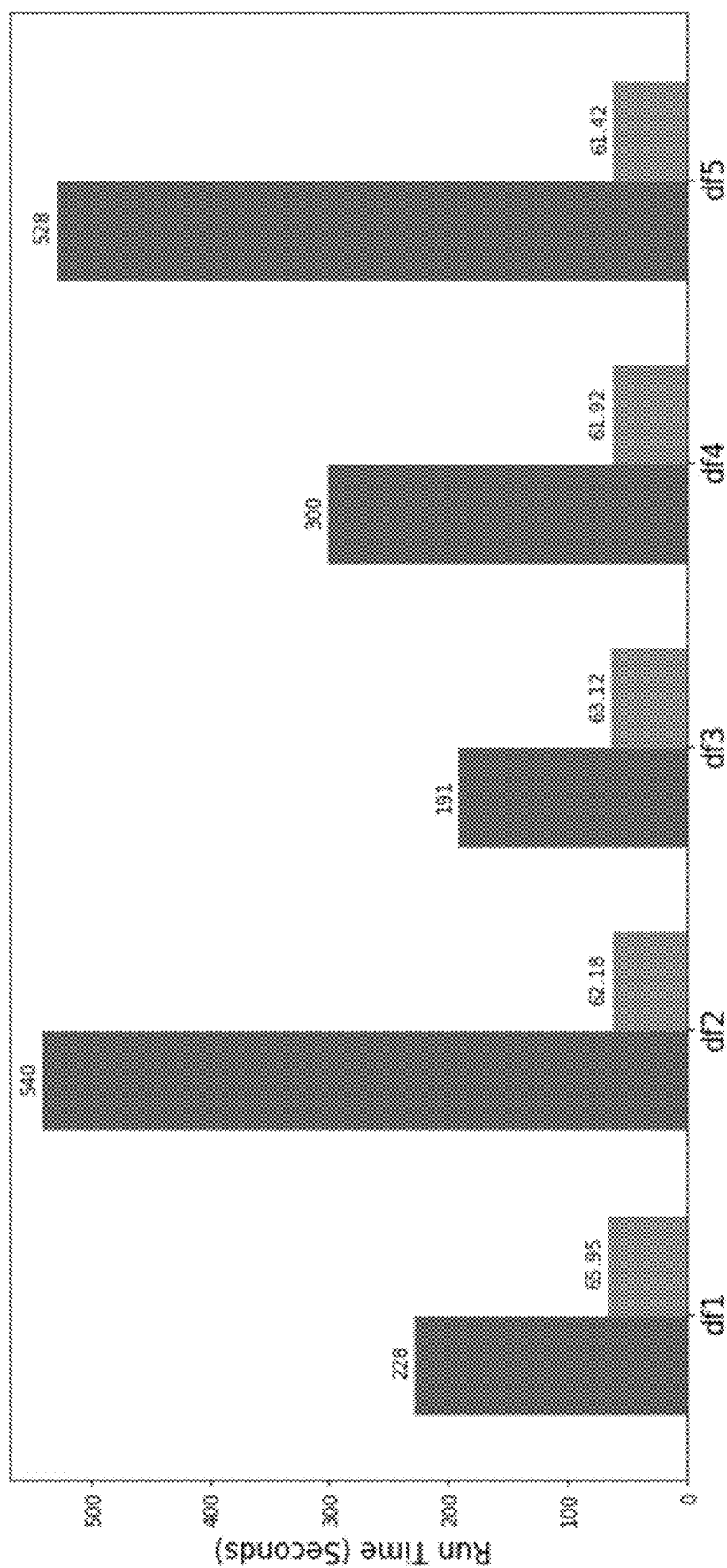
FIG. 19 shows runtime comparison results generated using model training application and an existing method in accordance with an illustrative embodiment.

Referring to FIG. 19, the runtime results generated using model training application 122 and the Boruta method with all five datasets is shown in accordance with an illustrative embodiment. Using the first dataset, a first Boruta runtime was 228 seconds using the Boruta method in comparison with a first runtime of 65.95 seconds using model training application 122. Using the second dataset, a second Boruta runtime was 540 seconds using the Boruta method in comparison with a second runtime of 62.18 seconds using model training application 122. Using the third dataset, a third Boruta runtime was 191 seconds using the Boruta method in comparison with a third runtime of 63.12 seconds using model training application 122. Using the fourth dataset, a fourth Boruta runtime was 300 seconds using the Boruta method in comparison with a fourth runtime of 61.92 seconds using model training application 122. Using the fifth dataset, a fifth Boruta runtime was 528 seconds using the Boruta method in comparison with a fifth runtime of 61.42 seconds using model training application 122. The results show the significantly faster runtime using model training application 122, and its scalability relative to existing methods.

Figure 20:
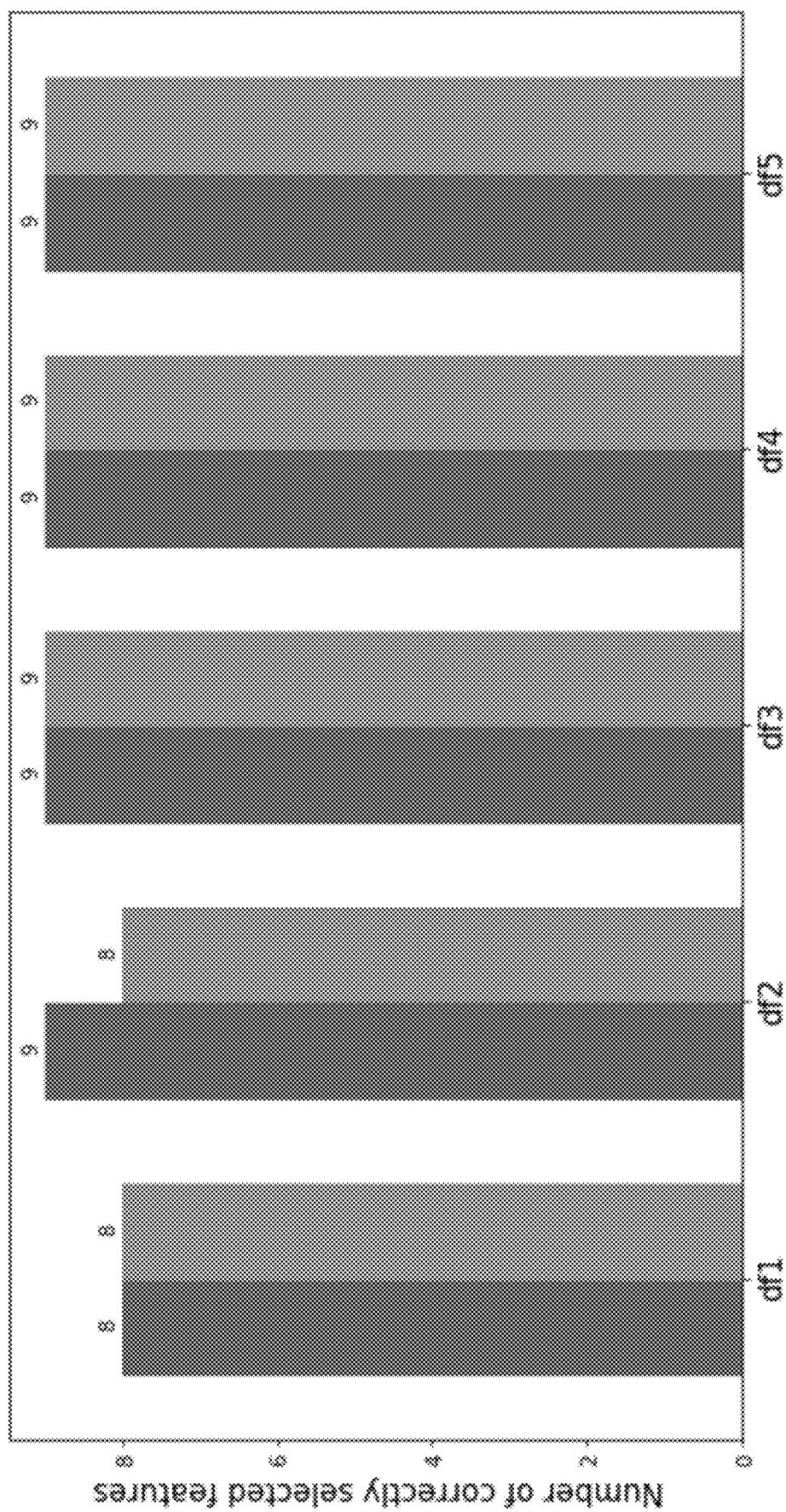
FIG. 20 shows accuracy comparison results generated using model training application and an existing method in accordance with an illustrative embodiment.

Referring to FIG. 20, the accuracy results generated using model training application 122 and the Boruta method with all five datasets is shown in accordance with an illustrative embodiment. Using the first dataset, both the Boruta method and model training application 122 identified 8 of the 10 relevant variables. Using the second dataset, the Boruta method identified 9 of the 10 relevant variables and model training application 122 identified 8 of the 10 relevant variables. Using the third dataset, the fourth dataset and the fifth dataset, both the Boruta method and model training application 122 identified 9 of the 10 relevant variables. The results show that model training application 122 provides nearly identical identification of the relevant variables while be significantly faster.

There are applications for model training application 122, user model training application 422, controller application 512, worker application 612, and/or prediction application 1522 in many areas such as process control and equipment health monitoring, image processing and classification, data segmentation, data analysis, etc. User model training application 422, controller application 512, and worker application 612 provide efficient distributed and parallel computing device implementations for selecting relevant variables.

The explosion of digital data is generating many opportunities for big data analytics, which in turn provides many opportunities for training clustering models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   determine a data description for each variable of a plurality of variables from a plurality of observation vectors, wherein each observation vector of the plurality of observation vectors includes a value for each variable of the plurality of variables, wherein determining the data description for each variable that has a nominal variable type comprises:
      determining frequency data for each unique value determined from each observation vector value of a respective variable for the plurality of observation vectors up to a maximum distinct count value number of unique values; and
      determining a cardinality estimate value for each variable of the plurality of variables;
   determine a number of rare-levels for any variable of the plurality of variables that has the nominal variable type, wherein determining the number of rare-levels for each variable that has the nominal variable type comprises a difference between the determined cardinality estimate value and a number of levels of the determined frequency data, wherein the number of levels is a number of unique values up to the maximum distinct count value, wherein the number of rare-levels is zero when the number of levels is less than or equal to the determined cardinality estimate value;
   define a plurality of bins for each variable of the plurality of variables based on the data description determined for each variable of the plurality of variables and based on the number of rare-levels determined for any variable of the plurality of variables identified as the nominal variable type, wherein the defined plurality of bins describe a cumulative distribution function for the respective variable;
   determine a transformed value for each variable of the plurality of variables and for each observation vector of the plurality of observation vectors using the plurality of bins defined for the respective variable of the plurality of variables; and
   write each determined transformed value to a transformed dataset with a respective observation vector of the plurality of observation vectors.

2. The non-transitory computer-readable medium of claim 1, wherein determining the transformed value for each variable of the plurality of variables and for each observation vector of the plurality of observation vectors is repeated a predefined plurality of times.

3. The non-transitory computer-readable medium of claim 1, wherein the value is a missing value.

4. The non-transitory computer-readable medium of claim 1, wherein the value of any variable of the plurality of variables that has the nominal variable type is not a quantitative value.

5. The non-transitory computer-readable medium of claim 1, wherein the data description describes statistical characteristics of the value for each observation vector of the plurality of observation vectors for a variable of the plurality of variables.

6. The non-transitory computer-readable medium of claim 1, wherein the computer-readable instructions further cause the computing device to:
   train a first machine learning model having a model type using the transformed dataset that includes a second plurality of variables, wherein the second plurality of variables includes the plurality of variables plus a transformed variable for each variable of the plurality of variables;
   determine an importance value of each variable of the second plurality of variables from the trained first machine learning model;
   select a set of relevant variables based on the determined importance value; and
   output the selected set of relevant variables.

7. The non-transitory computer-readable medium of claim 6, wherein the computer-readable instructions further cause the computing device to:
   train a second machine learning model having the model type using the selected set of relevant variables and the plurality of observation vectors; and
   output the trained second machine learning model.

8. The non-transitory computer-readable medium of claim 7, wherein the computer-readable instructions further cause the computing device to:
   instantiate a predictive model using the output trained second machine learning model;
   receive a new observation vector;
   compute a characteristic of the received, new observation vector using the instantiated predictive model; and
   output the computed characteristic of the new observation vector.

9. The non-transitory computer-readable medium of claim 8, wherein the new observation vector is received by reading it from a dataset.

10. The non-transitory computer-readable medium of claim 6, wherein the selected set of relevant variables are a predefined number of variables that have highest values for the importance value.

11. The non-transitory computer-readable medium of claim 6, wherein determining the transformed value for each variable of the plurality of variables and for each observation vector of the plurality of observation vectors is repeated a predefined additional number of times, wherein the second plurality of variables further includes another transformed variable for each variable of the plurality of variables for each of the predefined additional number of times.

12. The non-transitory computer-readable medium of claim 6, wherein the selected set of relevant variables explain an operation of a system modeled by the trained first machine learning model.

13. The non-transitory computer-readable medium of claim 1, wherein the data description determined for each variable that has an interval variable type includes cumulative quantile data determined from each observation vector value of the respective variable for the plurality of observation vectors.

14. The non-transitory computer-readable medium of claim 13, wherein defining the plurality of bins for each variable that has the interval variable type comprises:
   determining a number of bins in which to store the cumulative quantile data based on a quantile compression factor value;
   determining a bin boundary for each bin of the plurality of bins using the cumulative quantile data and the determined number of bins;
   determine a mean value, a standard deviation value, a minimum bin value, and a maximum bin value for each bin of the determined number of bins using each observation vector value of the respective variable included in a respective bin based on the determined bin boundary;
   store the determined mean value, the determined standard deviation value, the determined minimum bin value, and the determined maximum bin value in association with a bin index associated with each bin of the determined number of bins; and
   store the bin index of each respective bin in association with the determined bin boundary.

15. The non-transitory computer-readable medium of claim 14, wherein determining the transformed value for each variable that has the interval variable type comprises:
   determining a random number value from a uniform random distribution between zero and one inclusive;
   determining the bin index by comparing the determined random number value to the determined bin boundary for the plurality of bins;
   selecting the determined mean value, the determined standard deviation value, the determined minimum bin value, and the determined maximum bin value using the determined bin index; and
   determining a second random number value from a bounded Gaussian random distribution using the selected mean value and the selected standard deviation value bounded by the selected minimum bin value and the selected maximum bin value;
   wherein the transformed value is the determined second random number value.

16. The non-transitory computer-readable medium of claim 1, wherein defining the plurality of bins for each variable that has the nominal variable type comprises:

determining a number of bins as the maximum distinct count value plus one when the determined number of rare-levels is greater than zero;
   determining a bin boundary for each bin of the plurality of bins using the determined frequency data; and
   storing a bin index of each respective bin in association with the determined bin boundary.

17. The non-transitory computer-readable medium of claim 16, wherein determining the transformed value for each variable that has the nominal variable type comprises:
   determining a random number value from a uniform random distribution between zero and one inclusive;
   determining the bin index by multiplying the determined random number value by the determined number of bins, wherein the transformed value is a numeric value associated with the determined bin index when the determined bin index is less than the determined number of bins; and
   when the determined bin index is equal to the determined number of bins, determining a rare-level index as a second random number value drawn from a uniform random number distribution between one and the determined number of rare-levels inclusive, wherein the transformed value is a second numeric value associated with the determined rare-level index plus the predefined maximum distinct count value.

18. The non-transitory computer-readable medium of claim 1, wherein the data description for each variable of the plurality of variables is computed by merging a data subset description from each of a plurality of worker computing devices, wherein each worker computing device of a plurality of worker computing devices has a subset of the plurality of observation vectors stored thereon on which the worker computing device determines the data subset description.

19. The non-transitory computer-readable medium of claim 1, wherein the determined transformed value for each variable of the plurality of variables is computed by each worker computing device of a plurality of worker computing devices using a subset of the plurality of observation vectors stored thereon.

20. A system comprising:
   a processor; and
   a computer-readable medium operably coupled to the processor, the computer-readable medium having computer-readable instructions stored thereon that, when executed by the processor, cause the system to
      determine a data description for each variable of a plurality of variables from a plurality of observation vectors, wherein each observation vector of the plurality of observation vectors includes a value for each variable of the plurality of variables, wherein determining the data description for each variable that has a nominal variable type comprises:
         determining frequency data for each unique value determined from each observation vector value of a respective variable for the plurality of observation vectors up to a maximum distinct count value number of unique values; and
         determining a cardinality estimate value for each variable of the plurality of variables;
      determine a number of rare-levels for any variable of the plurality of variables that has the nominal variable type, wherein determining the number of rare-levels for each variable that has the nominal variable type comprises a difference between the determined cardinality estimate value and a number of levels of the determined frequency data, wherein the number of levels is a number of unique values up to the maximum distinct count value, wherein the number of rare-levels is zero when the number of levels is less than or equal to the determined cardinality estimate value;

define a plurality of bins for each variable of the plurality of variables based on the data description determined for each variable of the plurality of variables and based on the number of rare-levels determined for any variable of the plurality of variables identified as the nominal variable type, wherein the defined plurality of bins describe a cumulative distribution function for a respective variable;

determine a transformed value for each variable of the plurality of variables and for each observation vector of the plurality of observation vectors using the plurality of bins defined for the respective variable of the plurality of variables; and write each determined transformed value to a transformed dataset with the respective observation vector of the plurality of observation vectors.

21. A method of defining a plurality of transformed variable values for training a machine learning model, the method comprising:

determining, by a computing device, a data description for each variable of a plurality of variables from a plurality of observation vectors, wherein each observation vector of the plurality of observation vectors includes a value for each variable of the plurality of variables, wherein determining the data description for each variable that has a nominal variable type comprises:
  determining frequency data for each unique value determined from each observation vector value of a respective variable for the plurality of observation vectors up to a maximum distinct count value number of unique values; and
  determining a cardinality estimate value for each variable of the plurality of variables;

determining, by the computing device, a number of rare-levels for any variable of the plurality of variables that has the nominal variable type, wherein determining the number of rare-levels for each variable that has the nominal variable type comprises a difference between the determined cardinality estimate value and a number of levels of the determined frequency data, wherein the number of levels is a number of unique values up to the maximum distinct count value, wherein the number of rare-levels is zero when the number of levels is less than or equal to the determined cardinality estimate value;

defining, by the computing device, a plurality of bins for each variable of the plurality of variables based on the data description determined for each variable of the plurality of variables and based on the number of rare-levels determined for any variable of the plurality of variables identified as the nominal variable type, wherein the defined plurality of bins describe a cumulative distribution function for a respective variable;

determining, by the computing device, a transformed value for each variable of the plurality of variables and for each observation vector of the plurality of observation vectors using the plurality of bins defined for the respective variable of the plurality of variables; and writing, by the computing device, each determined transformed value to a transformed dataset with the respective observation vector of the plurality of observation vectors.

22. The method of claim 21, wherein the data description determined for each variable that has an interval variable type includes cumulative quantile data determined from each observation vector value of the respective variable for the plurality of observation vectors.

23. The method of claim 22, wherein defining the plurality of bins for each variable that has the interval variable type comprises:
  determining a number of bins in which to store the cumulative quantile data based on a quantile compression factor value;
  determining a bin boundary for each bin of the plurality of bins using the cumulative quantile data and the determined number of bins;
  determining a mean value, a standard deviation value, a minimum bin value, and a maximum bin value for each bin of the determined number of bins using each observation vector value of the respective variable included in a respective bin based on the determined bin boundary;
  storing the determined mean value, the determined standard deviation value, the determined minimum bin value, and the determined maximum bin value in association with a bin index associated with each bin of the determined number of bins; and
  storing the bin index of each respective bin in association with the determined bin boundary.

24. The method of claim 23, wherein determining the transformed value for each variable that has the interval variable type comprises:
  determining a random number value from a uniform random distribution between zero and one inclusive;
  determining the bin index by comparing the determined random number value to the determined bin boundary for the plurality of bins;
  selecting the determined mean value, the determined standard deviation value, the determined minimum bin value, and the determined maximum bin value using the determined bin index; and
  determining a second random number value from a bounded Gaussian random distribution using the selected mean value and the selected standard deviation value bounded by the selected minimum bin value and the selected maximum bin value;
  wherein the transformed value is the determined second random number value.

25. The method of claim 21, wherein defining the plurality of bins for each variable that has the nominal variable type comprises:
  determining a number of bins as the maximum distinct count value plus one when the determined number of rare-levels is greater than zero;
  determining a bin boundary for each bin of the plurality of bins using the determined frequency data; and
  storing a bin index of each respective bin in association with the determined bin boundary.

26. The method of claim 25, wherein determining the transformed value for each variable that has the nominal variable type comprises:
  determining a random number value from a uniform random distribution between zero and one inclusive;
  determining the bin index by multiplying the determined random number value by the determined number of bins, wherein the transformed value is a numeric value associated with the determined bin index when the determined bin index is less than the determined number of bins; and when the determined bin index is equal to the determined number of bins, determining a rare-level index as a second random number value drawn from a uniform random number distribution between one and the determined number of rare-levels inclusive, wherein the transformed value is a second numeric value associated with the determined rare-level index plus the predefined maximum distinct count value.

27. A non-transitory computer-readable medium having stored thereon computer-readable instructions that when executed by a computing device cause the computing device to:

determine a data description for each variable of a plurality of variables from a plurality of observation vectors, wherein each observation vector of the plurality of observation vectors includes a value for each variable of the plurality of variables, wherein determining the data description for each variable that has a nominal variable type comprises:

determining frequency data for each unique value determined from each observation vector value of a respective variable for the plurality of observation vectors up to a maximum distinct count value number of unique values; and determining a cardinality estimate value for each variable of the plurality of variables;

determine a number of rare-levels for any variable of the plurality of variables that has the nominal variable type;

define a plurality of bins for each variable of the plurality of variables based on the data description determined for each variable of the plurality of variables and based on the number of rare-levels determined for any variable of the plurality of variables identified as the nominal variable type, wherein the defined plurality of bins describe a cumulative distribution function for the respective variable, wherein defining the plurality of bins for each variable that has the nominal variable type comprises:

determining a number of bins as the maximum distinct count value plus one when the determined number of rare-levels is greater than zero;

determining a bin boundary for each bin of the plurality of bins using the determined frequency data; and storing a bin index of each respective bin in association with the determined bin boundary;

determine a transformed value for each variable of the plurality of variables and for each observation vector of the plurality of observation vectors using the plurality of bins defined for the respective variable of the plurality of variables; and write each determined transformed value to a transformed dataset with a respective observation vector of the plurality of observation vectors.

28. The non-transitory computer-readable medium of claim 27, wherein determining the transformed value for each variable that has the nominal variable type comprises:

determining a random number value from a uniform random number distribution between zero and one inclusive;

determining the bin index by multiplying the determined random number value by the determined number of bins, wherein the transformed value is a numeric value associated with the determined bin index when the determined bin index is less than the determined number of bins; and when the determined bin index is equal to the determined number of bins, determining a rare-level index as a second random number value drawn from a uniform random number distribution between one and the determined number of rare-levels inclusive, wherein the transformed value is a second numeric value associated with the determined rare-level index plus the predefined maximum distinct count value.

29. A system comprising:

a processor; and a computer-readable medium operably coupled to the processor, the computer-readable medium having computer-readable instructions stored thereon that, when executed by the processor, cause the system to determine a data description for each variable of a plurality of variables from a plurality of observation vectors, wherein each observation vector of the plurality of observation vectors includes a value for each variable of the plurality of variables, wherein determining the data description for each variable that has a nominal variable type comprises:

determining frequency data for each unique value determined from each observation vector value of a respective variable for the plurality of observation vectors up to a maximum distinct count value number of unique values; and determining a cardinality estimate value for each variable of the plurality of variables;

determine a number of rare-levels for any variable of the plurality of variables that has the nominal variable type;

define a plurality of bins for each variable of the plurality of variables based on the data description determined for each variable of the plurality of variables and based on the number of rare-levels determined for any variable of the plurality of variables identified as the nominal variable type, wherein the defined plurality of bins describe a cumulative distribution function for the respective variable, wherein defining the plurality of bins for each variable that has the nominal variable type comprises:

determining a number of bins as the maximum distinct count value plus one when the determined number of rare-levels is greater than zero;

determining a bin boundary for each bin of the plurality of bins using the determined frequency data; and storing a bin index of each respective bin in association with the determined bin boundary;

determine a transformed value for each variable of the plurality of variables and for each observation vector of the plurality of observation vectors using the plurality of bins defined for the respective variable of the plurality of variables; and write each determined transformed value to a transformed dataset with a respective observation vector of the plurality of observation vectors.

30. A method of defining a plurality of transformed variable values for training a machine learning model, the method comprising:

determining, by a computing device, a data description for each variable of a plurality of variables from a plurality of observation vectors, wherein each observation vector of the plurality of observation vectors includes a value for each variable of the plurality of variables, wherein determining the data description for each variable that has a nominal variable type comprises:
   determining frequency data for each unique value determined from each observation vector value of a respective variable for the plurality of observation vectors up to a maximum distinct count value number of unique values; and
   determining a cardinality estimate value for each variable of the plurality of variables;
determining, by the computing device, a number of rare-levels for any variable of the plurality of variables that has the nominal variable type;
defining, by the computing device, a plurality of bins for each variable of the plurality of variables based on the data description determined for each variable of the plurality of variables and based on the number of rare-levels determined for any variable of the plurality of variables identified as the nominal variable type, wherein the defined plurality of bins describe a cumulative distribution function for the respective variable, wherein defining the plurality of bins for each variable that has the nominal variable type comprises:
   determining a number of bins as the maximum distinct count value plus one when the determined number of rare-levels is greater than zero;
   determining a bin boundary for each bin of the plurality of bins using the determined frequency data; and
   storing a bin index of each respective bin in association with the determined bin boundary;
determining, by the computing device, a transformed value for each variable of the plurality of variables and for each observation vector of the plurality of observation vectors using the plurality of bins defined for the respective variable of the plurality of variables; and
writing, by the computing device, each determined transformed value to a transformed dataset with a respective observation vector of the plurality of observation vectors.

\* \* \* \* \*